(12) United States Patent
Williams et al.

(10) Patent No.: US 8,291,707 B2
(45) Date of Patent: Oct. 23, 2012

(54) MULTI-STAGE CHECK VALVE

(75) Inventors: Brandon P. Williams, Urbandale, IA (US); Nathan J. James, Greenville, SC (US)

(73) Assignee: Delavan Inc, West Des Moines, IA (US)

( * ) Notice: Subject to any disclaimer, the term of this patent is extended or adjusted under 35 U.S.C. 154(b) by 1078 days.

(21) Appl. No.: 12/193,378

(22) Filed: Aug. 18, 2008

(65) Prior Publication Data

US 2010/0037615 A1 Feb. 18, 2010

(51) Int. Cl.
*F02C 7/228* (2006.01)
(52) U.S. Cl. .......................... 60/741; 60/742; 137/512.1
(58) Field of Classification Search ................ 60/741, 60/740, 742, 739; 239/416.4, 416.5, 417; 137/512.1
See application file for complete search history.

(56) References Cited

U.S. PATENT DOCUMENTS

| | | | | |
|---|---|---|---|---|
| 3,564,580 | A * | 2/1971 | Cinque | 261/79.1 |
| 4,570,668 | A * | 2/1986 | Burke et al. | 137/512.2 |
| 5,732,730 | A * | 3/1998 | Shoemaker et al. | 137/118.06 |
| 5,918,628 | A * | 7/1999 | Harding | 137/512.1 |
| 6,901,953 | B2 * | 6/2005 | D'Agostino et al. | 60/741 |
| 6,951,209 | B2 * | 10/2005 | Yanase et al. | 137/512.2 |
| 2004/0154302 | A1 * | 8/2004 | Wernberg et al. | 60/739 |

FOREIGN PATENT DOCUMENTS

| | | |
|---|---|---|
| EP | 0 853 196 A1 | 7/1998 |
| GB | 1 281 362 | 7/1972 |

OTHER PUBLICATIONS

UK Intellectual Property Search Report dated Dec. 2, 2009.
UK Intellectual Property Examination Report dated Nov. 1, 2011 for GB Application No. 0914233.2.
United Kingdom Examination Report dated May 8, 2012 issued on United Kingdom Patent Application No. GB0914233.

* cited by examiner

*Primary Examiner* — Ted Kim
(74) *Attorney, Agent, or Firm* — Edwards Wildman Palmer LLP; Scott D. Wofsy; Joshua L. Jones

(57) ABSTRACT

A multi-stage check valve includes a valve housing defining an internal valve chamber. A main valve member within the valve chamber of the valve housing has an internal valve chamber. In the first position thereof the main valve member blocks fuel below a predetermined main pressure from flowing through a main fuel path. In the second position thereof the main valve member is displaced to allow fuel above the predetermined main pressure to flow through the main fuel path. The multi-stage check valve also includes a pilot valve member within the valve chamber of the main valve member. In the first position thereof, the pilot valve member blocks fuel below a predetermined pilot pressure from flowing through a pilot fuel path. In the second position thereof, the pilot valve member is displaced to allow fuel above the predetermined pilot pressure to flow through the pilot fuel path.

20 Claims, 21 Drawing Sheets

Injector Flow Curve

MULTI-STAGE CHECK VALVE

BACKGROUND OF THE INVENTION

1. Field of the Invention

The present invention relates to fuel injectors and nozzles, and more particularly, to check valves used in fuel injectors and nozzles for gas turbine engines.

2. Description of Related Art

A variety of devices and methods are known in the art for regulating fuel flow in fuel injectors and nozzles during engine start up and low flow conditions. Of such devices, many are directed to check valves for preventing or reducing fuel flow through injectors and nozzles prior to start up.

During the starting cycle of a gas-turbine engine, fuel is supplied at a set mass flow rate to a manifold by the fuel pump, which creates the pressure needed to deliver the required mass flow rate. The manifold supplies fuel to a plurality of fuel injectors. Many fuel injectors contain a check valve to help ensure that fuel is not introduced to the combustor until a set manifold pressure is reached. Due to manufacturing tolerances and spring force variations, the point at which the check valves open, or "crack," can vary significantly.

If the fuel injector is sized for a low pressure, high flow system, the effect of variations in crack pressure can cause serious maldistribution of fuel flow from one injector to the next. The manifold pressure can be just high enough to open a few of the check valves, allowing the fuel to pass virtually unrestricted out of the open injectors due to the injector passage sizes, while other injector check valves remain closed and therefore not flowing. Particularly during the ignition sequence, when manifold pressures are low, some injectors can be in a no flow state, while other injectors are flowing at relatively high rates. This uneven distribution of fuel can create difficulties in achieving ignition and light around. Even at typical ground idle fuel flow rates, it is possible for some of the injectors to be in the no flow condition. This can lead to poor low power emissions due to uneven distribution of fuel within the combustor. Moreover, the fact that some injectors are not flowing can cause combustor stress due to temperature gradients, i.e. hot spots and cold spots, around the combustor.

A typical check valve includes a piston biased to seal against a seat through some mechanical means, such as a spring. The crack pressure is determined by the piston area and the spring preloading force. Once the fuel pressure is high enough to overcome the spring preload, the piston lifts from its seat to allow flow. If the pressure drops below the spring preloading force, the valve will close and reseal. Due to variations in the spring preloading and piston area from check valve to check valve, injectors employing such check valves can have widely varied crack pressures within a single combustor, leading to the problems described above.

One solution to this problem is to use scheduling valves instead of check valves. A typical scheduling valve employs a match grind between a shaft and a bore of a cylinder. The precision is high enough to provide high precision porting that will control the fuel flow proportional to manifold fuel pressure. As the pressure builds, the open area of the scheduling valve increases. There is often a check valve integral with the scheduling valve. Back pressure from the scheduling feature helps ensure that there is uniform flow throughout the manifold.

Scheduling valves are effective at overcoming the short comings described above for traditional check valves. However, scheduling valves are relatively expensive to manufacture due to the high tolerances required. Scheduling valves are also prone to hysteresis. The hysteresis occurs because of stack up tolerances and material property differences. There is also a difference in the perceived piston area, which causes the pressure load to be different depending on where the piston is in relation to its stroke. The precision porting is also prone to malfunction due to particles and contaminants in the fuel, which can drastically affect the flow.

U.S. Pat. No. 5,918,628 to Harding describes a multi-stage check valve in which a valve poppet moves within a valve housing as fuel pressure on the valve poppet increases. Radial through-holes of two different diameters are staged axially along the valve poppet. Just after the poppet unseats from the valve housing, fuel flows first only through a small through-hole providing a low flow rate. Then as fuel pressure increases and the poppet moves further into the valve housing, larger through-holes in the poppet are opened to allow for a larger fuel flow through the check valve. This configuration provides fuel staging with relatively low pressure drop. However, the valve described in the Harding Patent requires the piston to be matched closely to the sleeve portion to ensure schedule "rigidity" or relative separation of the primary and second state. Thus there can not be a large tolerance around the piston. One major restriction in the Harding valve is that the coupling of the opening of the ports relies upon one single spring. This can drive the design to have undesirable effects on the physical envelope required to contain the design, i.e., the staging requirements in the Harding design drive the size of the check valve because there is only one spring for both high and low pressure ports. The Harding valve also does not necessarily seal the second stage from the primary stage.

Such conventional methods and systems generally have been considered satisfactory for their intended purpose. However, there still remains a continued need in the art for a valving device that can provide improved operability across a range of fuel flow rates. There also remains a need in the art for such a valving device that is easy to make and use. The present invention provides a solution for these problems.

SUMMARY OF THE INVENTION

The subject invention is directed to a new and useful multi-stage check valve for regulating fuel flow in a fuel injector of a gas turbine engine. The multi-stage check valve includes a valve housing defining an internal valve chamber. A main valve member within the valve chamber of the valve housing has an internal valve chamber and is configured for movement between a first position and a second position. In the first position thereof, the main valve member blocks fuel below a predetermined main pressure from flowing through a main fuel path. In the second position thereof, the main valve member is displaced to allow fuel above the predetermined main pressure to flow through the main fuel path. The multi-stage check valve also includes a pilot valve member within the valve chamber of the main valve member. The pilot valve member is configured for movement between a first position and a second position. In the first position thereof, the pilot valve member blocks fuel below a predetermined pilot pressure from flowing through a pilot fuel path. In the second position thereof, the pilot valve member is displaced to allow fuel above the predetermined pilot pressure to flow through the pilot fuel path.

In various embodiments, the predetermined pilot pressure is lower than the predetermined main pressure. The multi-stage check valve can further include an orifice member defining a metering orifice therethrough operably associated with the main valve member to meter fuel flow through the pilot fuel path for fuel between the predetermined pilot and main pressures. It is contemplated that the main valve member can be operably connected to the valve housing through a first spring member configured and adapted to bias the main valve member to block the main fuel path in the first position of the main valve member. Moreover, the pilot valve member can be operably connected to a second spring member configured and adapted to bias the pilot valve member to block the pilot fuel path in the first position of the pilot valve member.

In certain embodiments, the main valve member includes a seal component configured and adapted to form a seal with the valve housing to block the main fuel path in the first position of the main valve member. The pilot valve member can also include a seal component configured and adapted to form a seal with the main valve member to block the pilot fuel path in the first position of the pilot valve member. Moreover, it is also contemplated that the valve housing can include a seal component configured and adapted to form a seal with both of the main and pilot valve members to block the main and pilot fuel paths with the main and pilot valve members in the respective first positions. The seal component can include Viton®, or any other suitable material. It is also possible to make a multi-stage check valve using hard seals alone or in combination with elastomeric seals for the different respective stages.

It is further contemplated that the multi-stage check valve can further include a third valve member between the valve housing and the main valve member. The third valve member can be configured for movement between a first position and a second position. In the first position thereof, the third valve member blocks fuel below a third predetermined pressure from flowing through a third fuel paths and in the second position thereof, the third valve member is displaced to allow fuel above the third predetermined pressure to flow through the third fuel path.

The invention also includes a fuel injector for a gas turbine engine. The fuel injector includes a fuel feed arm having a fuel inlet fitting in fluid communication with at least one fuel conduit within the fuel feed arm. A nozzle body depends from the fuel feed arm and includes a fuel outlet in fluid communication with the at least one fuel conduit of the fuel feed arm. A multi-stage check valve within the fuel feed arm is operatively connected to the at least one fuel conduit. The multi-stage check valve includes a valve housing defining an internal valve chamber. A main valve member within the valve chamber of the valve housing has an internal valve chamber and is configured for movement between a first position and a second position. In the first position thereof, the main valve member blocks fuel below a predetermined main pressure from flowing through a main fuel path, and in the second position thereof the main valve member is displaced to allow fuel above the predetermined main pressure to flow through the main fuel path. A pilot valve member within the valve chamber of the main valve member is configured for movement between a first position and a second position. In the first position thereof; the pilot valve member blocks fuel below a predetermined pilot pressure from flowing through a pilot fuel path, and in the second position thereof, the pilot valve member is displaced to allow fuel above the predetermined pilot pressure to flow through the pilot fuel path.

It is also contemplated that the fuel feed can arm include a first fuel conduit fluidly connecting the first fuel path of the multi-stage check valve with a first fuel circuit of the nozzle body. Moreover, a second fuel conduit can fluidly connect the second fuel path of the multi-stage check valve with a second fuel circuit of the nozzle body.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the multi-stage check valve and fuel injector of the subject invention without undue experimentation, preferred embodiments thereof will be described in detail herein below with reference to certain figures, wherein.

DETAILED DESCRIPTION OF THE PREFERRED EMBODIMENTS

Figure 8:
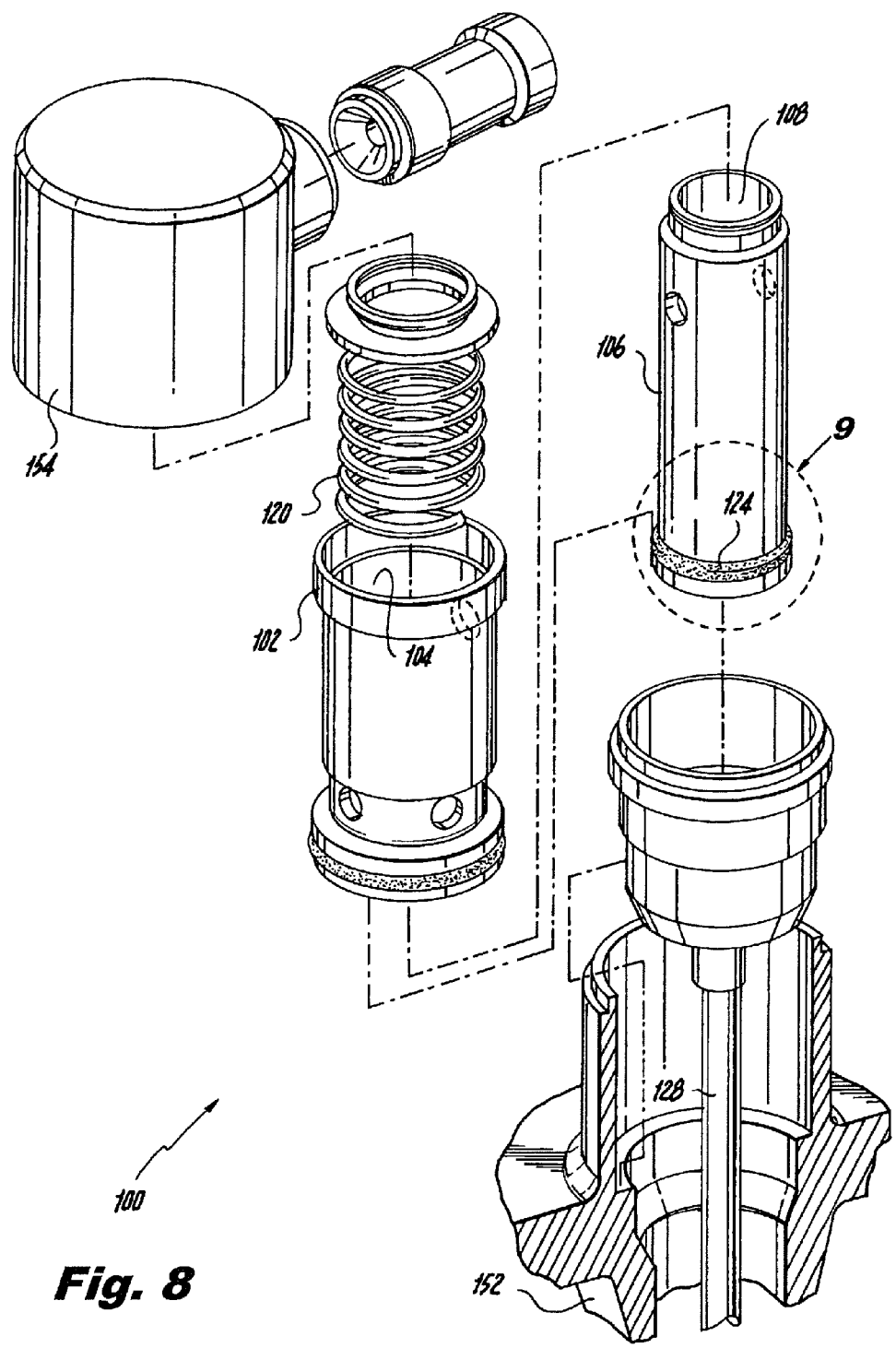
FIG. 8 is an exploded perspective view of a portion of a first embodiment of a multi-stage check valve constructed in accordance with the present invention, showing the main valve member and the valve housing.

Reference will now be made to the drawings wherein like reference numerals identify similar structural features or aspects of the subject invention. For purpose of explanation and illustration, and not limitation, a partial view of an exemplary embodiment of the multi-stage check valve in accordance with the invention is shown in FIG. 8 and is designated generally by reference character 100. Other embodiments of a multi-stage check valve in accordance with the invention, or aspects thereof, are provided in FIGS. 9-29, as will be described. The system of the invention can be used in gas turbine engines for regulating fuel flow to injectors during engine start up and other low power settings.

Figure 1:
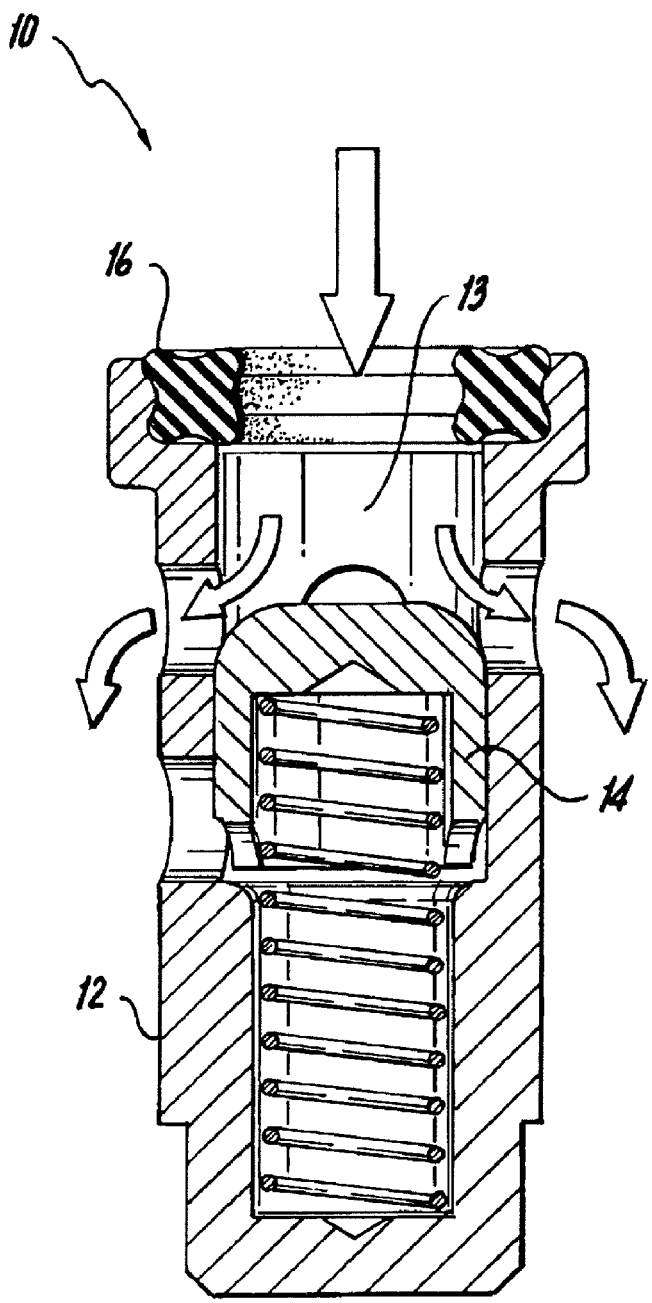
FIG. 1 is a cross-sectional side elevation view of a prior art simple check valve, showing the piston unseated from the valve housing to allow fuel flow therethrough.

FIG. 1 shows a simple check valve 10. A valve housing 12 with an internal valve chamber 13 housing a spring loaded piston 14 is connected to a fuel conduit in a fuel injector (not shown). When no fuel is flowing through check valve 10, piston 14 is seated against seal component 16 of housing 12. When fuel pressure on piston 14 exceeds a given limit, the pressure force acting on piston 14 overcomes the spring force to unseat piston 14 from seal component 16, allowing fuel to flow through check valve 10, as indicated by arrows in FIG. 1.

Figure 2:
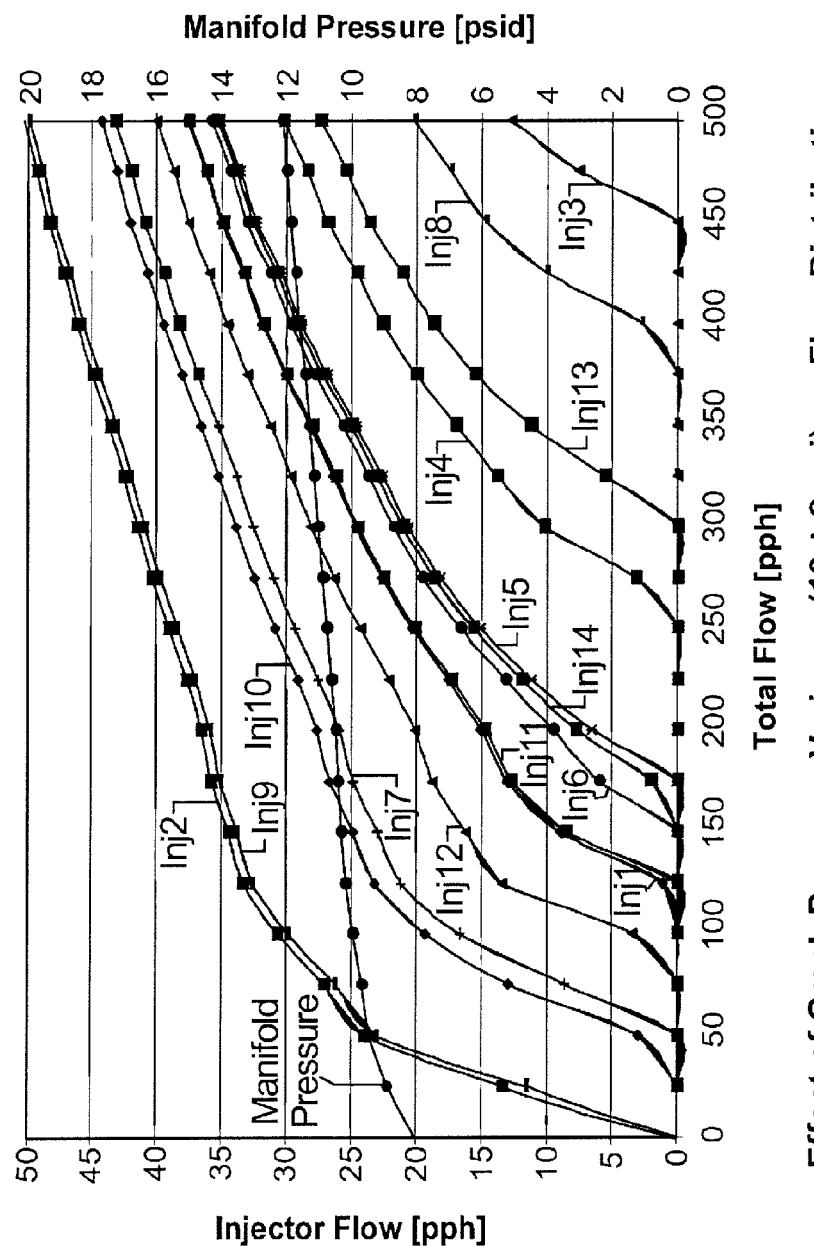
FIG. 2 is a plot of injector flow versus total flow for a system using fourteen of the prior art simple check valves of FIG. 1, showing the effect of crack pressure variance of 10 psid±2 psig on flow distribution for the system.

FIG. 2 shows a plot of injector flow versus total flow for a system having fourteen simple check valves as described above. The curves in FIG. 2 were generated assuming the average crack pressure of 10 varies by about ±2 psi for the fourteen simple check valves. As can be seen in FIG. 2, there is a range of over 400 pph between the opening of the first and last check valves. Moreover, at a total flow as high as about 150 pph, only half of the check valves/injectors issue fuel, while the other half remain in a zero flow state.

Figure 3:
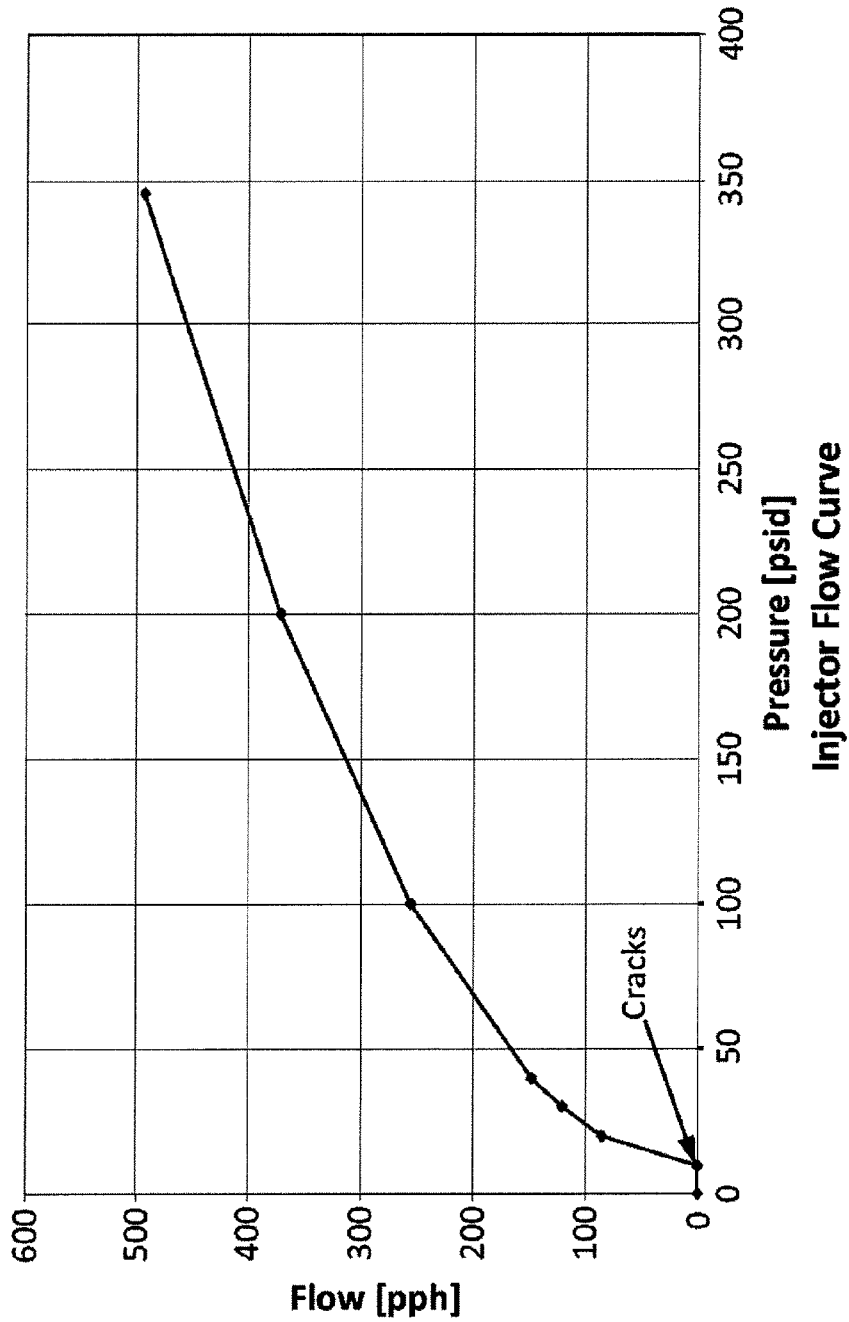
FIG. 3 is a plot of flow versus pressure for the simple check valve of FIG. 1, showing the injector flow curve.

Since ignition in a typical engine can be from about 150-200 pph total manifold flow and ground idle for a typical engine can be about 400 pph of total flow, it can be readily ascertained that during ignition, less than half of the injectors may be issuing fuel, and even at ground idle operation, some injectors may still not be issuing fuel. This leads to the emissions problems described above. Moreover, at ground idle conditions, the temperatures of the combustor flame proximate each injector can vary greatly since some injectors may be blocked, and the remaining injectors can vary widely in flow rate. This leads to the hot and cold spots discussed above. A curve showing manifold pressure across the range of total flow is also shown for reference in FIG. 2. FIG. 3 shows the injector flow curve for a simple check valve as described above, showing the crack pressure at about 12 psid.

Figure 4:
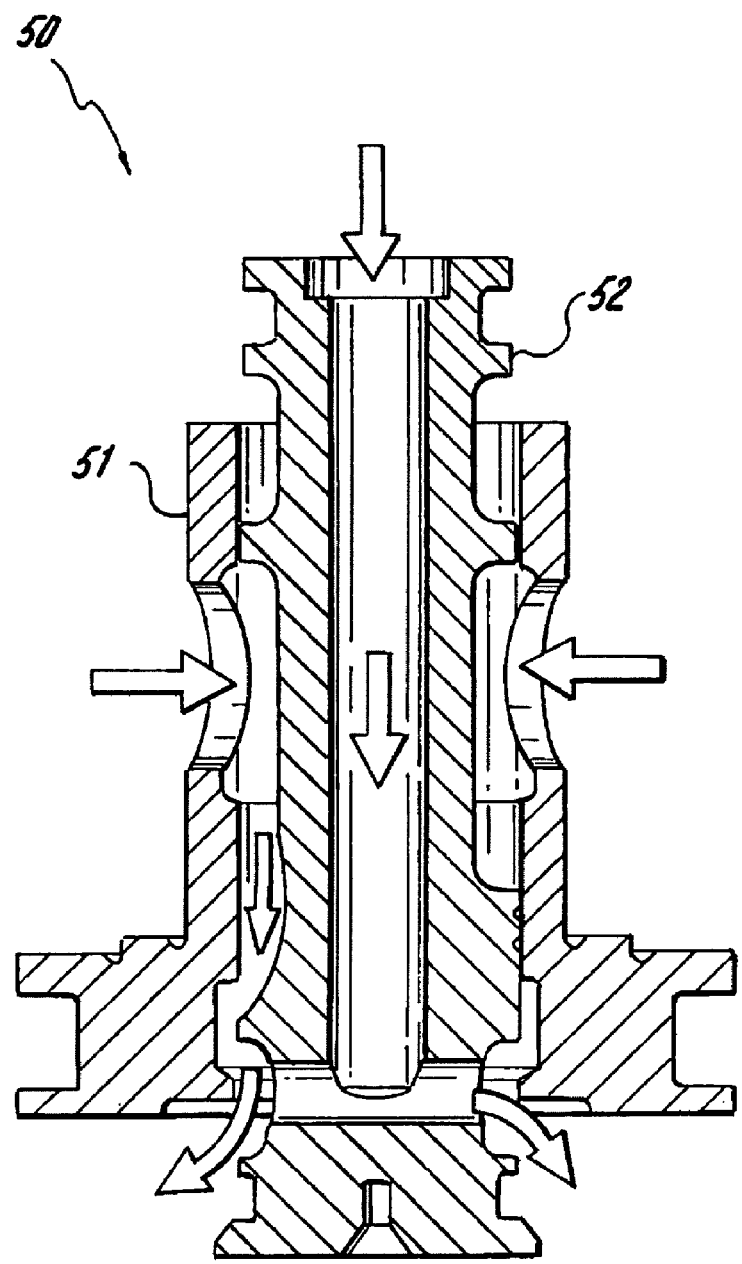
FIG. 4 is a cross-sectional side elevation view of a prior art scheduling valve, showing the high precision porting for regulating fuel flow.
Figure 5:
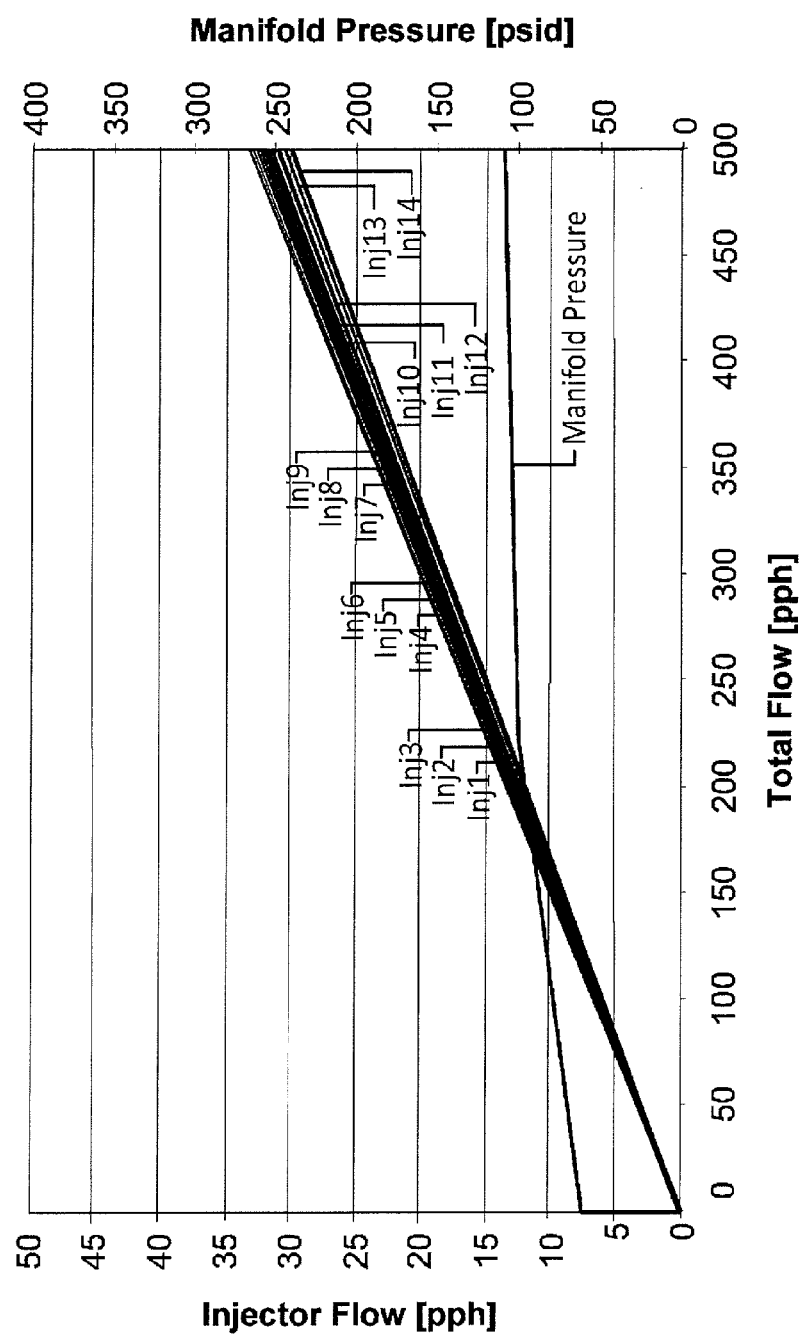
FIG. 5 is a plot of injector flow versus total flow for a system using fourteen of the prior at scheduling valves of FIG. 4, showing the effect of crack pressure variance of 63 psid±3 psig on flow distribution for the system.
Figure 6:
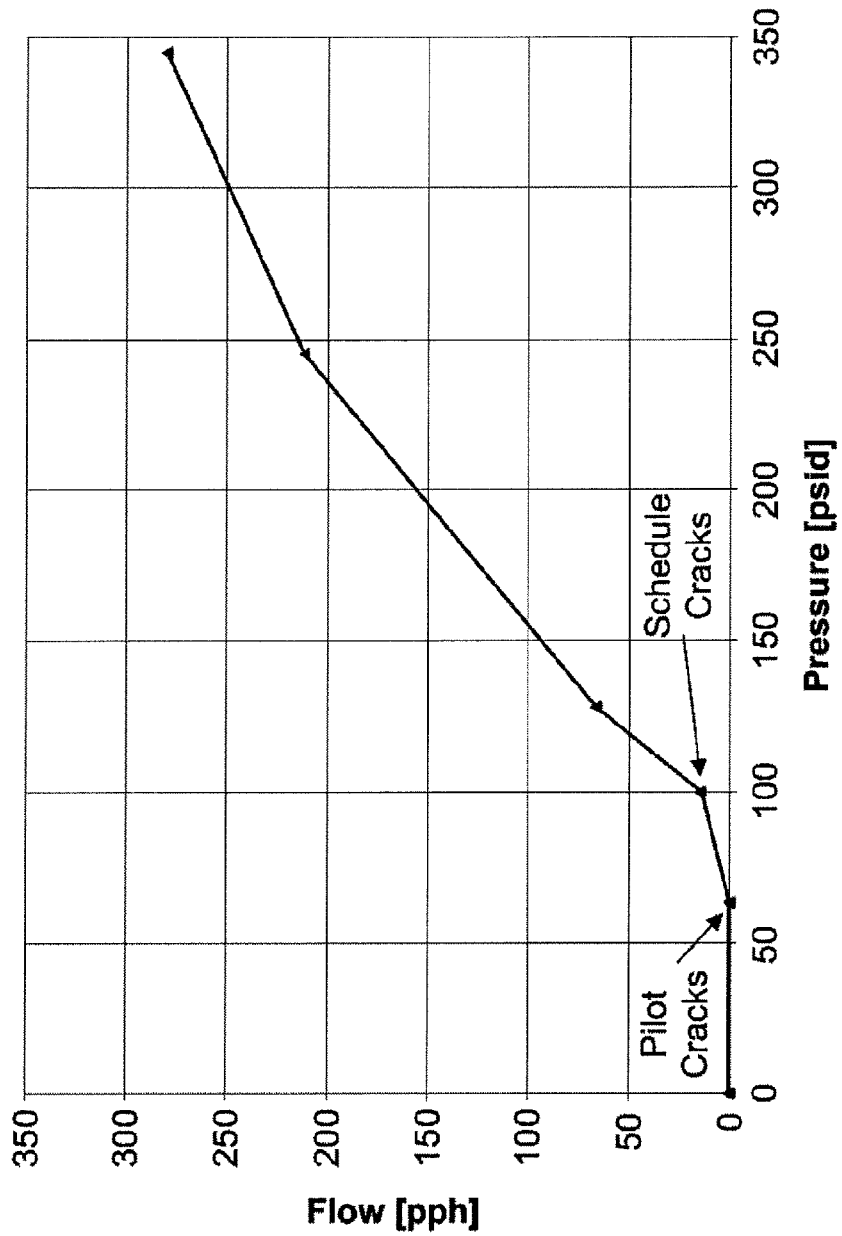
FIG. 6 is a plot of flow versus pressure for the scheduling valve of FIG. 4.

With reference now to FIG. 4, a prior art scheduling valve 50 is shown, having a valve housing 51 and a valve member 52. The high precision porting of valve housing 51 and valve member 52 are configured to increase flow area as valve member 52 is gradually displaced under mounting fuel pressure in valve housing 51 (arrows indicate the flow paths in FIG. 4). Even with crack pressure varying within 63 psid±3 psig, this configuration provides for very low injector flow variance, as indicated in the tight grouping of injector flow curves in FIG. 5, which can be compared with FIG. 2 above. FIG. 5 also shows a manifold pressure curve for reference. FIG. 6 can be compared to FIG. 3 and shows a plot of injector flow curves, including the crack pressure of the schedule features and of the associated pilot check valve, for the scheduling valve of FIG. 4. The back pressure from the scheduling features helps ensure that there is uniform flow throughout the manifold/combustor. However, there are problems associated with scheduling valves, as described above.

Figure 7:
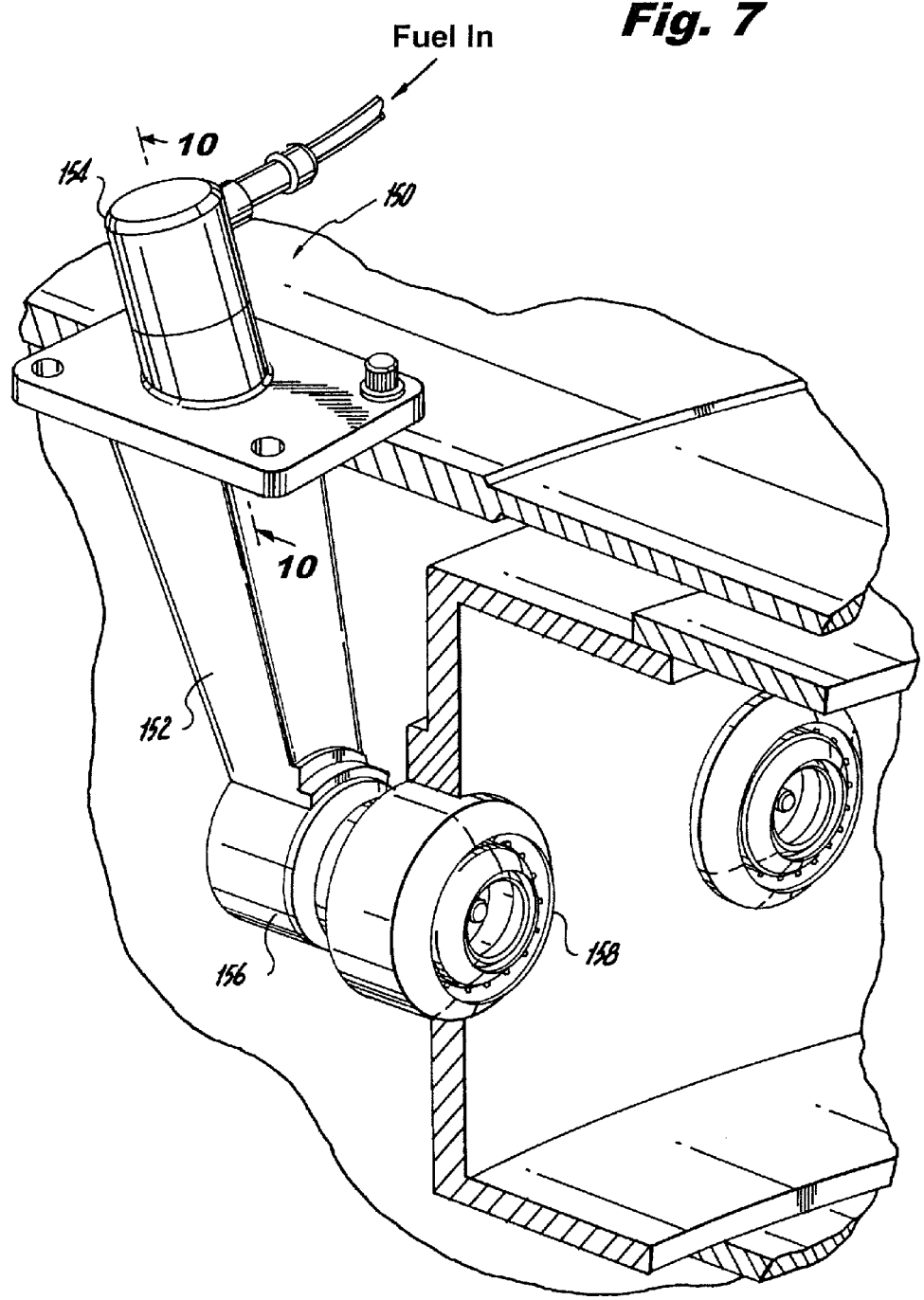
FIG. 7 is a perspective view of a first embodiment of an injector constructed in accordance with the present invention, showing the injector in a partially cut-away portion of a combustor.

As shown in FIG. 7, the invention includes a fuel injector 150 for a gas turbine engine. Fuel injector 150 includes a fuel feed arm 152 having a fuel inlet fitting 154 in fluid communication with at least one fuel conduit 128 (see FIG. 8) within feed arm 152. A nozzle body 156 depends from feed arm 152 and includes a fuel outlet 158 in fluid communication with fuel conduit 128 of feed arm 152.

Figure 9:
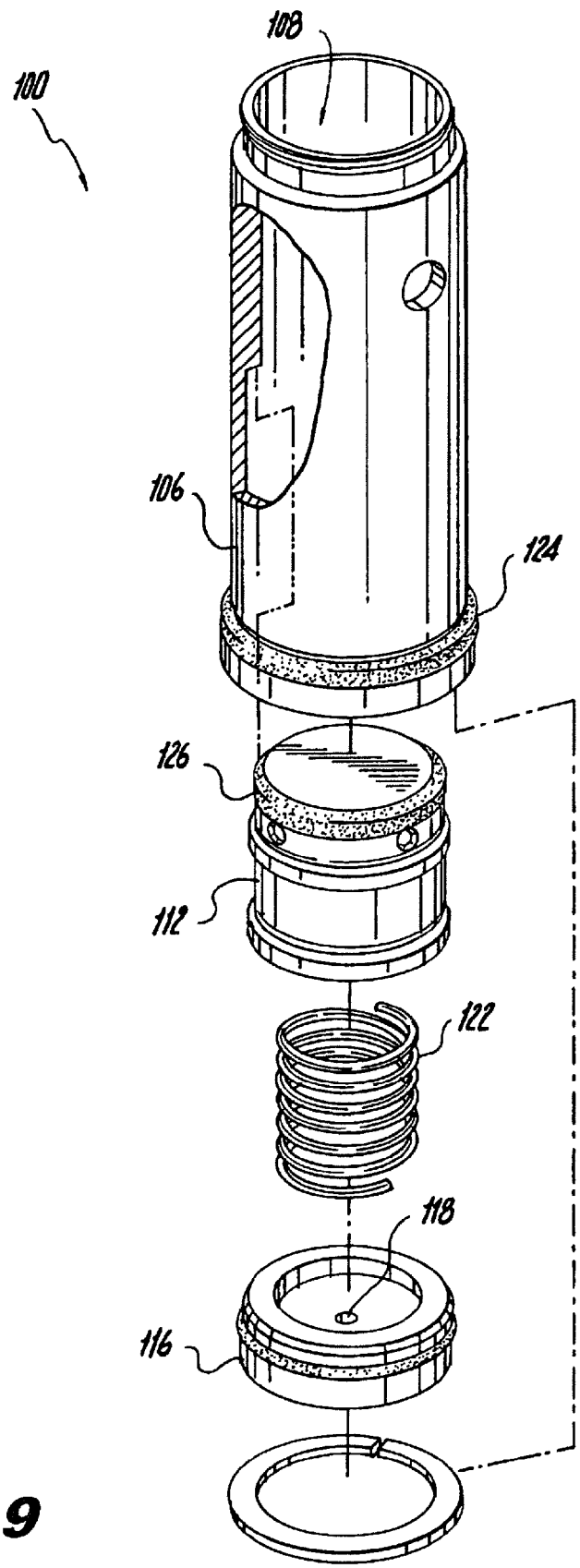
FIG. 9 is an exploded perspective view of a portion of the multi-stage check valve of FIG. 8, showing the main and pilot valve members.

With reference now to FIG. 8, a multi-stage check valve 100 within injector 150 is operatively connected one fuel conduit 128 to regulate fuel flow to nozzle body 156. In accordance with the invention, multi-stage check valve 100 includes a valve housing 102 defining an internal valve chamber 104. A main valve member 106 within valve chamber 104 of valve housing 102 has an internal valve chamber 108 and is configured for movement between a first position and a second position. As shown in FIG. 9, multi-stage check valve 100 also includes a pilot valve member 112 within valve chamber 108 of main valve member 106. Pilot valve member 112 is configured for movement between a first position and a second position.

Figure 10:
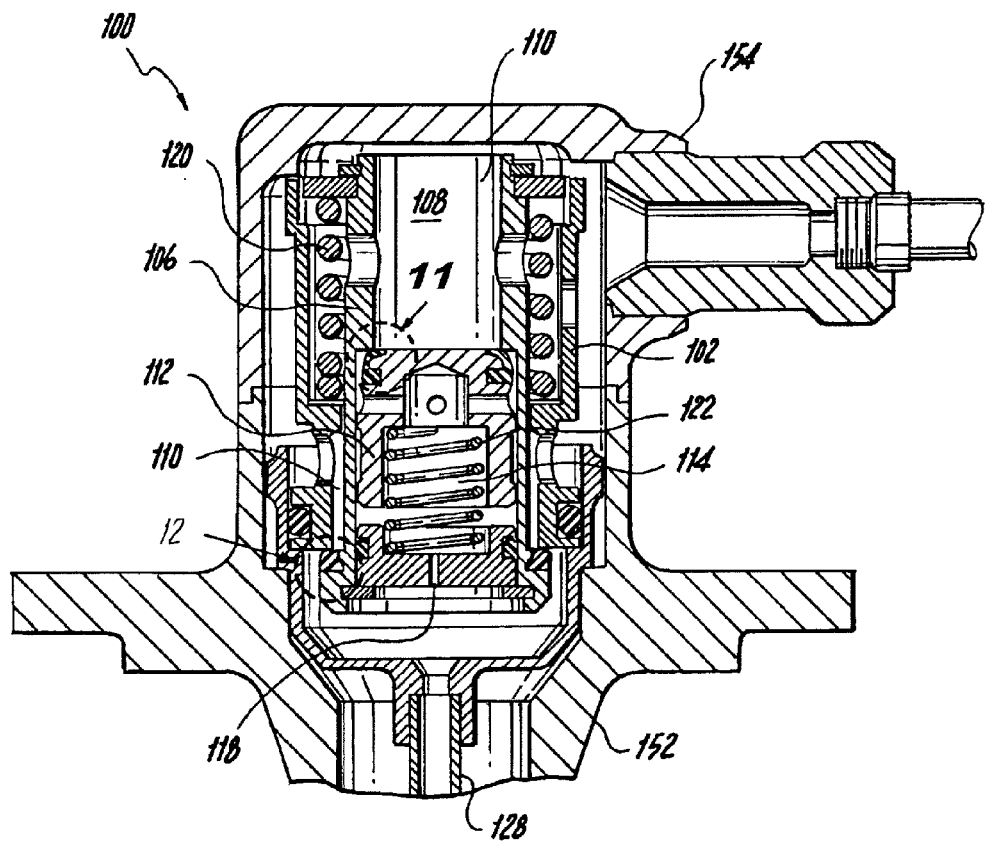
FIG. 10 is a cross-sectional side elevation view of the multi-stage check valve of FIG. 8, showing the valve members blocking the pilot and main flow paths.
Figure 11:
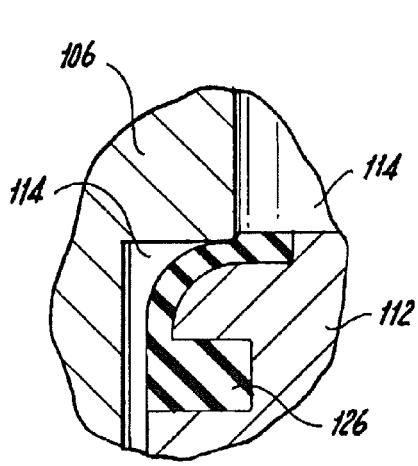
FIG. 11 is an expanded cross-sectional side elevation view of a portion of the multi-stage check valve of FIG. 10, showing the seal component of the pilot valve member.
Figure 12:
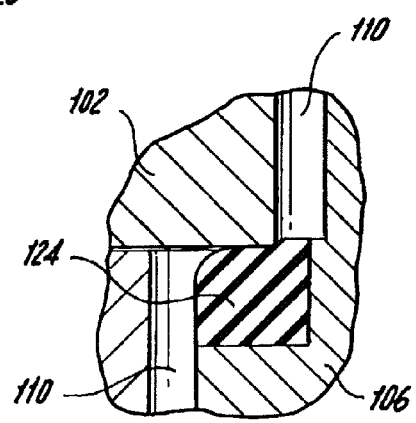
FIG. 12 is an expanded cross-sectional side elevation view of a portion of the multi-stage check valve of FIG. 10, showing the seal component of the main valve member.

FIG. 10 shows main valve member 106 and pilot valve member 112 each in a first position, effectively blocking flow of fuel through main fuel path 110 and pilot fuel path 114. As shown in the enlarged view of FIG. 11, pilot valve member 112 includes a seal component 126 configured and adapted to form a seal with main valve member 106 to block pilot fuel path 114 in the first position of pilot valve member 112. As shown in the enlarged view of FIG. 12, main valve member 106 includes a seal component 124 configured and adapted to form a seal with valve housing 102 to block main fuel path 110 in the first position of main valve member 106. Seal components 124 and 126 are configured for soft seal or zero leak sealing.

Figure 13:
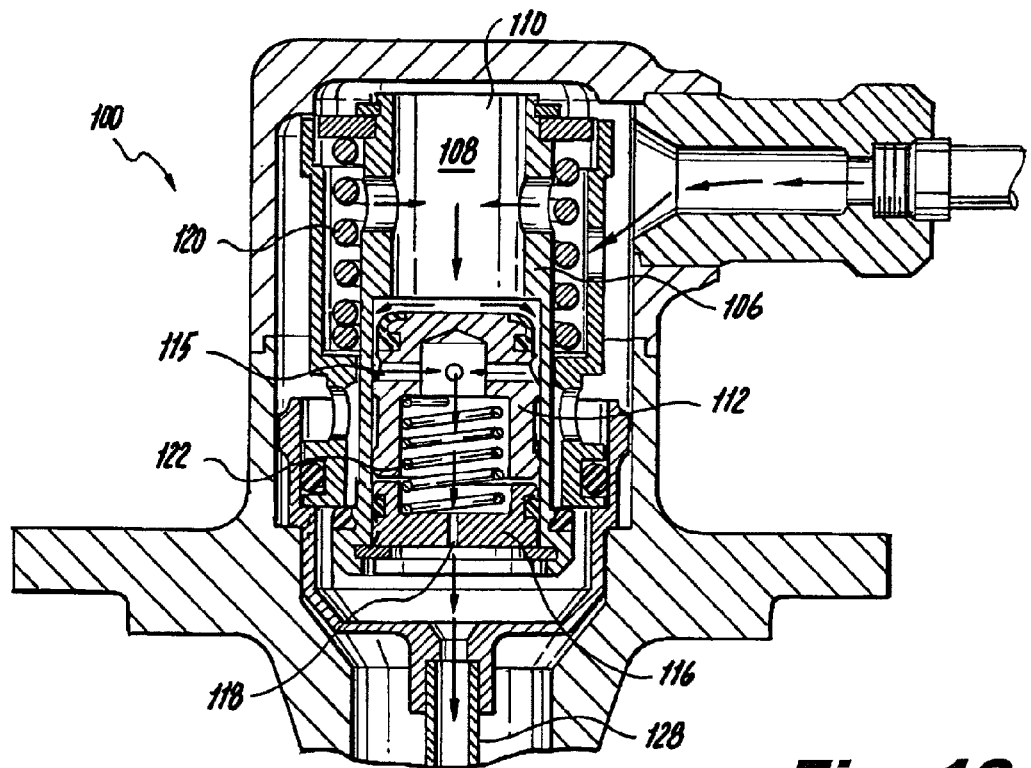
FIG. 13 is a cross-sectional side elevation view of the multi-stage check valve of FIG. 10, showing the pilot valve member displaced to allow fuel to flow through the pilot flow path.

As fuel pressure in internal valve chamber 108 increases, pilot valve member 112 is displaced as shown in FIG. 13 to allow fuel to flow around the upstream face of pilot valve member 112, through radial passages 115 and into conduit 128, as indicated by arrows in FIG. 13. Multi-stage check valve 100 further includes an orifice member 116 defining a metering orifice 118 therethrough operably associated with main valve member 106 to meter fuel flow rates through pilot fuel path 114 (see FIG. 11) for fuel between the predetermined pilot and main pressures This allows for a roughly constant flow rate through pilot flow path 114 as pressure builds, allowing for a low power flow distribution in a combustor. Metering orifice 118 allows for a limited pilot flow of fuel during low power operation, while allowing pressure in valve chamber 108 to continue increasing. As the fuel pressure continues to build, eventually main valve member 106 eventually moves downstream to open main fuel path 110 (see FIG. 12) around the downstream end thereof, as shown by arrows in FIG. 14. Thus, at higher power levels both main and pilot fuel paths 110/114 can issue fuel through the injector.

Figure 14:
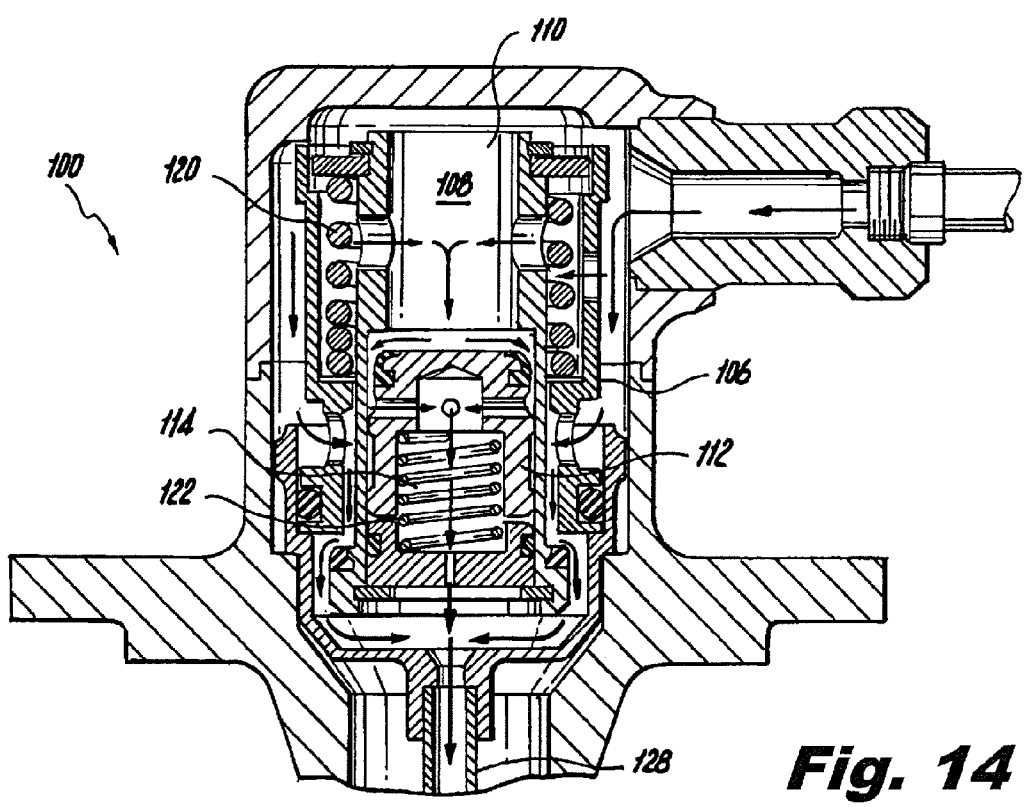
FIG. 14 is a cross-sectional side elevation view of the multi-stage check valve of FIG. 10, showing both the pilot and main valve members displaced to allow fuel to flow through the main and pilot flow paths.

As shown in FIGS. 13 and 14, main valve member 106 is connected to valve housing 102 through a first spring member 120 configured and adapted to bias main valve member 106 to block main fuel path 110 in the first position of main valve member 106. Pilot valve member 112 is operably connected to a second spring member 122 configured and adapted to bias pilot valve member 112 to block pilot fuel path 114 in the first position of pilot valve member 112. Crack pressure is a function of piston area and spring preload force. The respective spring members are configured to provide a spring force that corresponds to the desired crack pressure given the respective valve member's piston area. Therefore a given valve member can be displaced when the pressure force acting thereon overcomes the spring force biasing the valve member to the closed position. The spring members and/or piston areas can thus be configured to provide the predetermined pilot and main pressures. Spring member 122 is configured to provide a predetermined pilot pressure that is lower than the predetermined main pressure, for which spring member 120 is configured. Those skilled in the art will readily appreciate that the spring members can be configured to provide any suitable specific crack pressures for specific applications. Other exemplary spring types include Belleville style, disc springs, wave type springs. Any other suitable spring type can also be used. Spring choice with respect to mechanical properties such as yield strength is based on preload (crack) and stroke.

Figure 15:
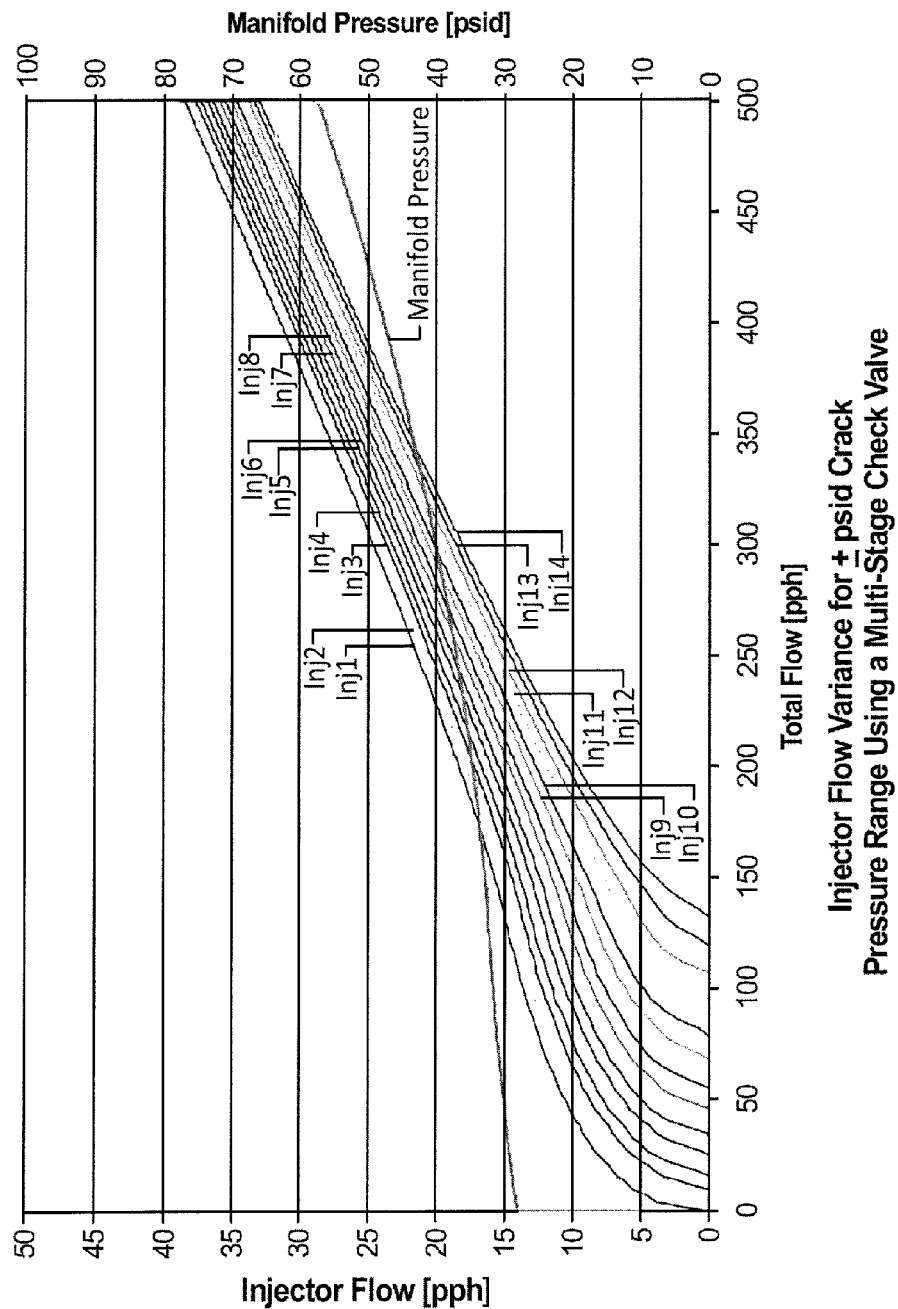
FIG. 15 is a plot of injector flow versus total flow for a system using fourteen of the multi-stage check valves of FIG. 10, showing the effect of crack pressure variance on flow distribution for the system, where the crack pressure of the first stage varies within 30 psid±2 psig.
Figure 16:
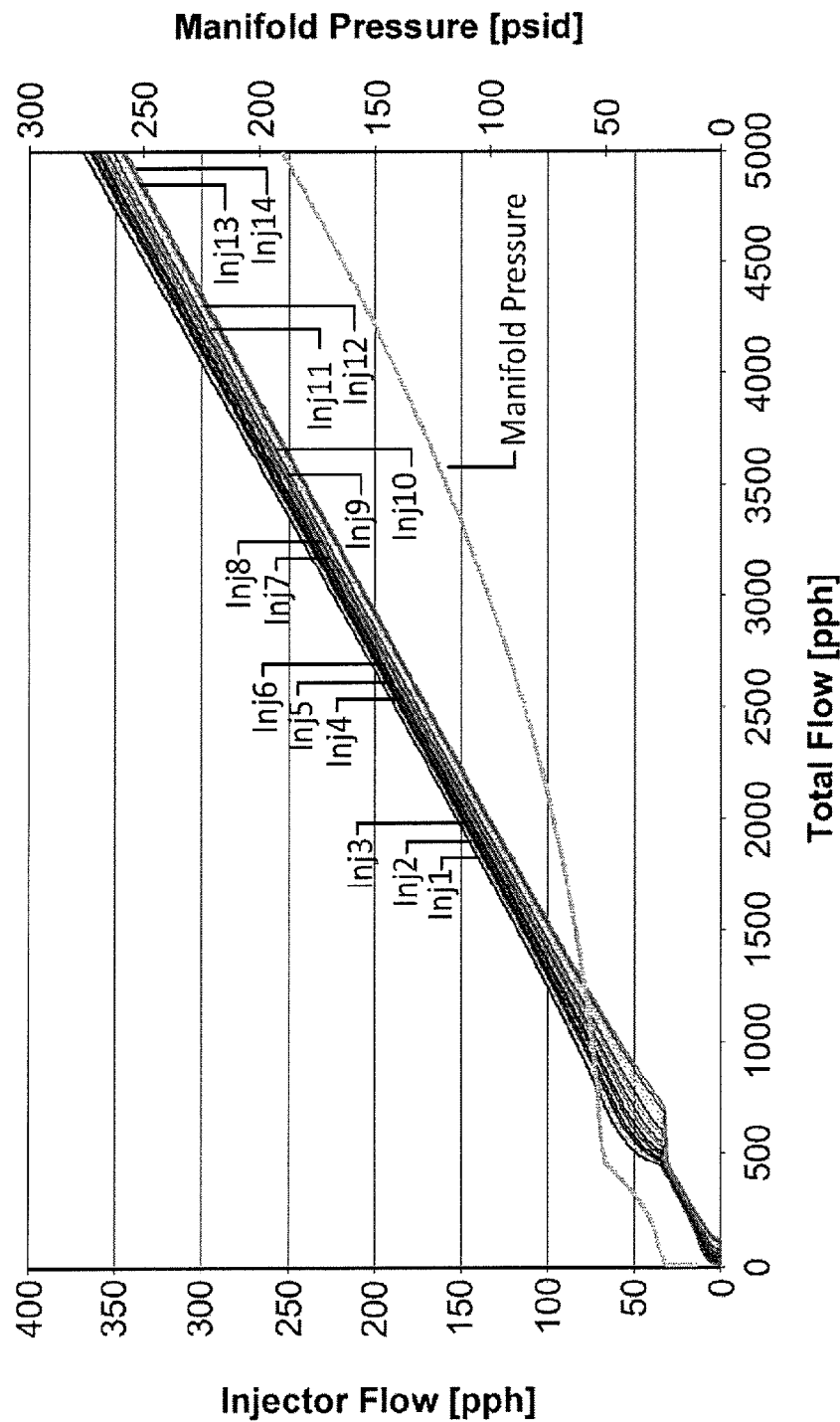
FIG. 16 is a plot of injector flow versus total flow for a system using fourteen of the multi-stage check valves of FIG. 10, showing the effect of crack pressure variance on flow distribution for a range of total flow rates including the injector flow rates at which the main stages reach their respective crack pressures, where the crack pressure variance for the main stage varies within 63 psid±2 psig.
Figure 17:
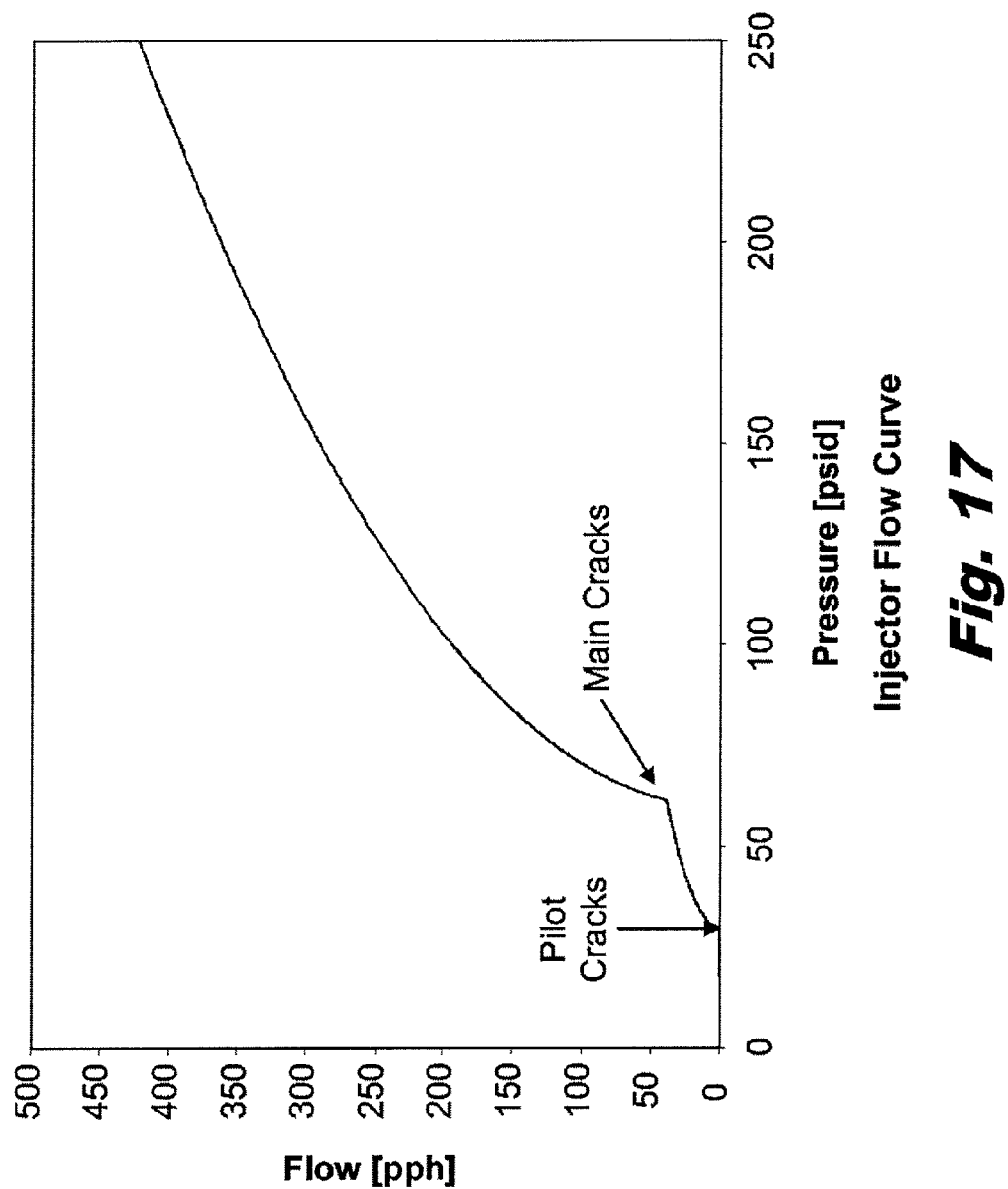
FIG. 17 is a plot of flow versus pressure for the multi-stage check valve of FIG. 10.

FIG. 15 shows a plot of an exemplary injector flow versus total flow for multi-stage check valve 100 and can be compared to FIGS. 2 and 5. In the plot of FIG. 15, the pilot stage has a crack pressure of 30 psid, which varies ±2 psig for the fourteen injectors. FIG. 15 shows only the total flows for the pilot stage. FIG. 16 shows exemplary curves for total flows out to 5,000 pph, which also shows the crack pressure for the main stage at about 63 psid at around 600 pph total flow. Comparing FIG. 15 with FIG. 2 shows that the multi-stage check valve has a significantly lower injector flow variance than known simple check valves for low flow conditions. FIGS. 15 and 16 also show manifold pressure over the total flow range for reference. FIG. 17 shows exemplary injector flow curves for three multi-stage injectors, which shows the pilot and main crack pressures. Those skilled in the art will readily appreciate that while exemplary crack pressures and crack pressure variances were used to generate the plots in FIGS. 15-17, multi-stage check valve 100 can be configured to have any suitable crack pressures and crack pressure variance without departing from the spirit and scope of the invention.

As can be seen in the plots of FIGS. 16-17, there is a transition that can be accounted for in the design of multi-stage check valves. The transition point can be determined based on engine operating conditions. It is highly desirable to avoid steady-state engine conditions occurring within the transition zone. The main crack pressure can be advantageously adjusted to be within overall manifold pressure limits, and to provide uniformity at operating conditions on either side of the transition.

Figure 18:
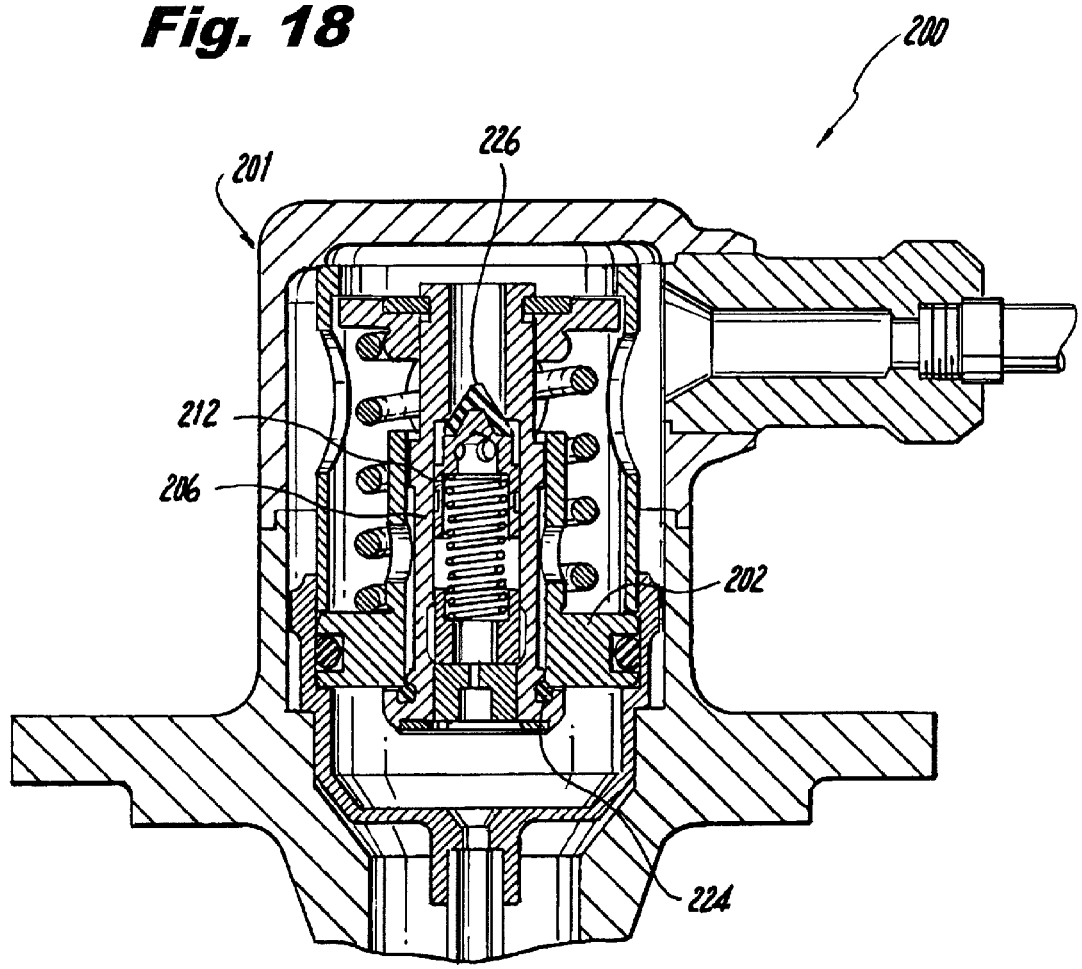
FIG. 18 is a cross-sectional side elevation view of another embodiment of a multi-stage check valve constructed in accordance with the present invention, showing the valve members blocking the pilot and main flow paths wherein the pilot valve member includes a conical piston portion.
Figure 19:
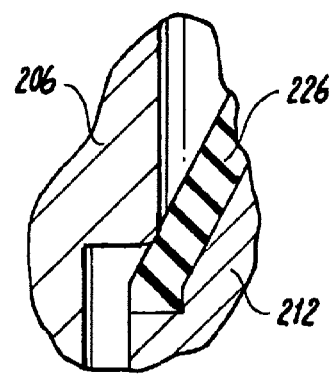
FIG. 19 is an expanded cross-sectional side elevation view of a portion of the multi-stage check valve of FIG. 18, showing the seal component of the pilot valve member.
Figure 20:
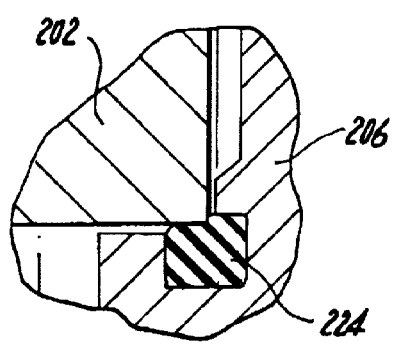
FIG. 20 is an expanded cross-sectional side elevation view of a portion of the multi-stage check valve of FIG. 18, showing the seal component of the main valve member.
Figure 21:
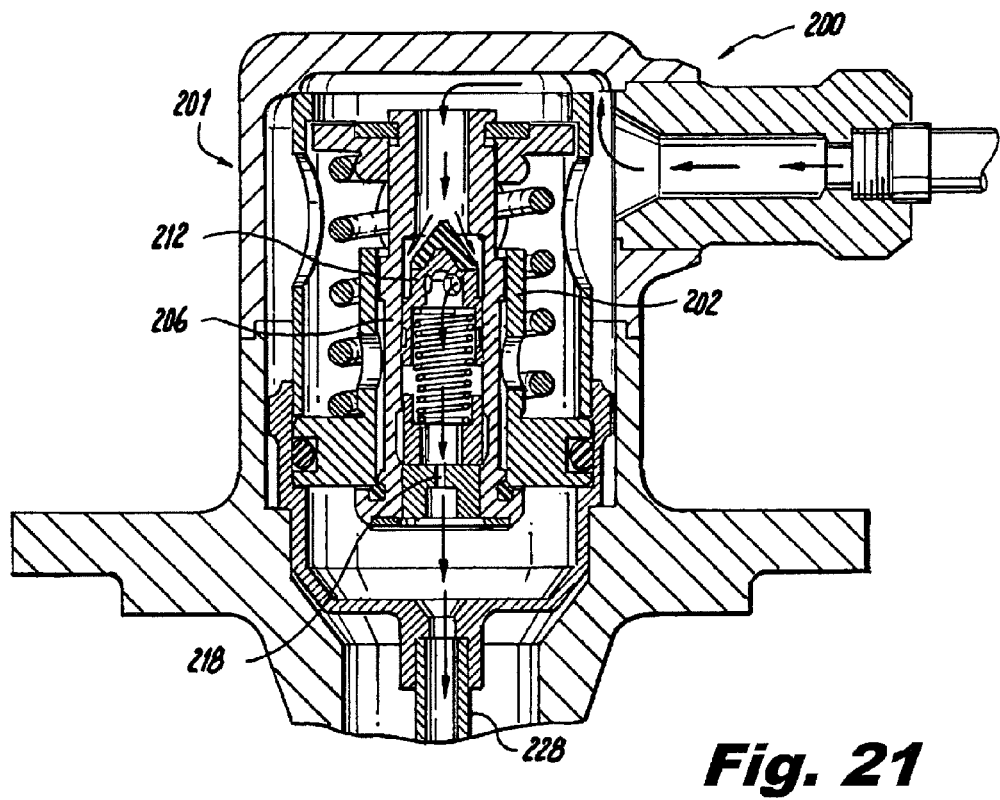
FIG. 21 is a cross-sectional side elevation view of the multi-stage check valve of FIG. 18, showing the pilot valve member displaced to allow fuel to flow through the pilot flow path.
Figure 22:
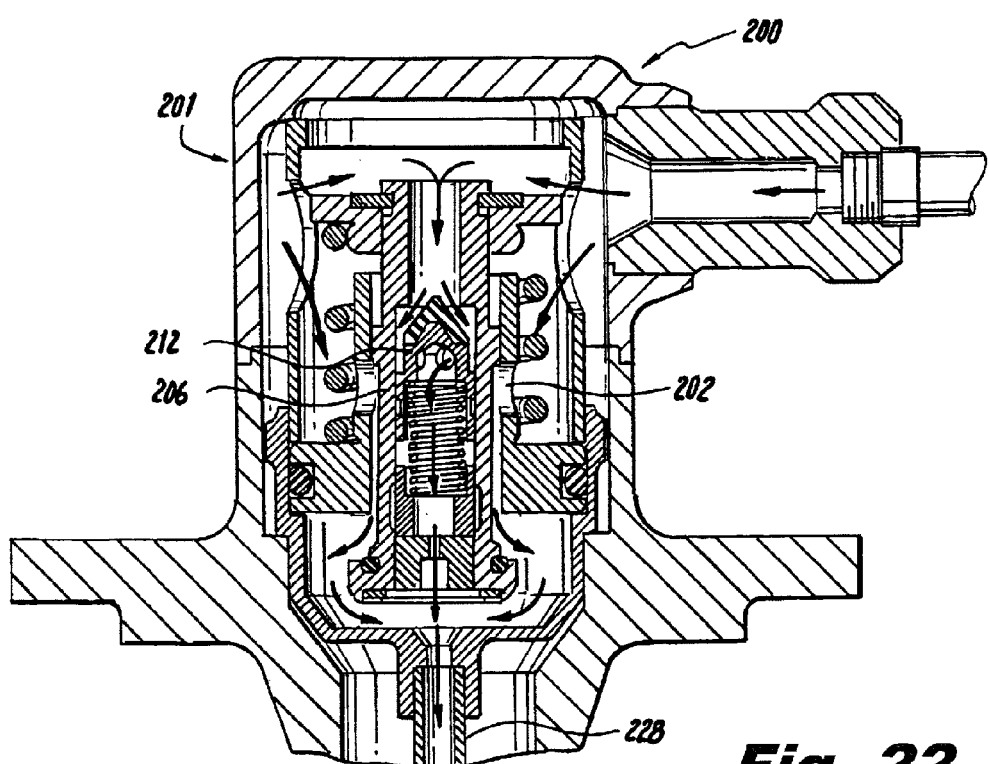
FIG. 22 is a cross-sectional side elevation view of the multi-stage check valve of FIG. 18, showing the pilot and main valve members displaced to allow fuel to flow through the main and pilot flow paths.

FIGS. 18-22 show another embodiment of a multi-stage check valve 200 within an injector 201 having a pilot valve member 212 within a main valve member 206. Each of the main and pilot valve members 206/212 are spring loaded, much as described above. Pilot valve member 212 includes a seal component 226 that is generally conical in shape. FIG. 19 shows a close-up view of seal component 226 as it is seated against main valve component 206. FIG. 20 shows a close-up view of the sealing engagement of seal component 224 of main valve member 206 against valve housing 202. FIG. 18 shows multi-stage check valve 200 in a no-flow condition. The general operation of the main and pilot valve components 206/212 is much the same as described above with respect to multi-stage check valve 100. FIG. 21 shows multi-stage check valve 200 with the pilot valve member 212 displaced to allow fuel to pass through the pilot fuel path, including metering orifice 218, into conduit 228, as indicated by arrows. FIG. 22 shows main and pilot valve members 206/212 displaced to allow fuel to flow through both fuel paths, as indicated by arrows. One advantage of check valve 200 is that the generally conical shape of seal component 226 can provide an enhanced ability to flush contaminants out of the way of the seal.

Figure 23:
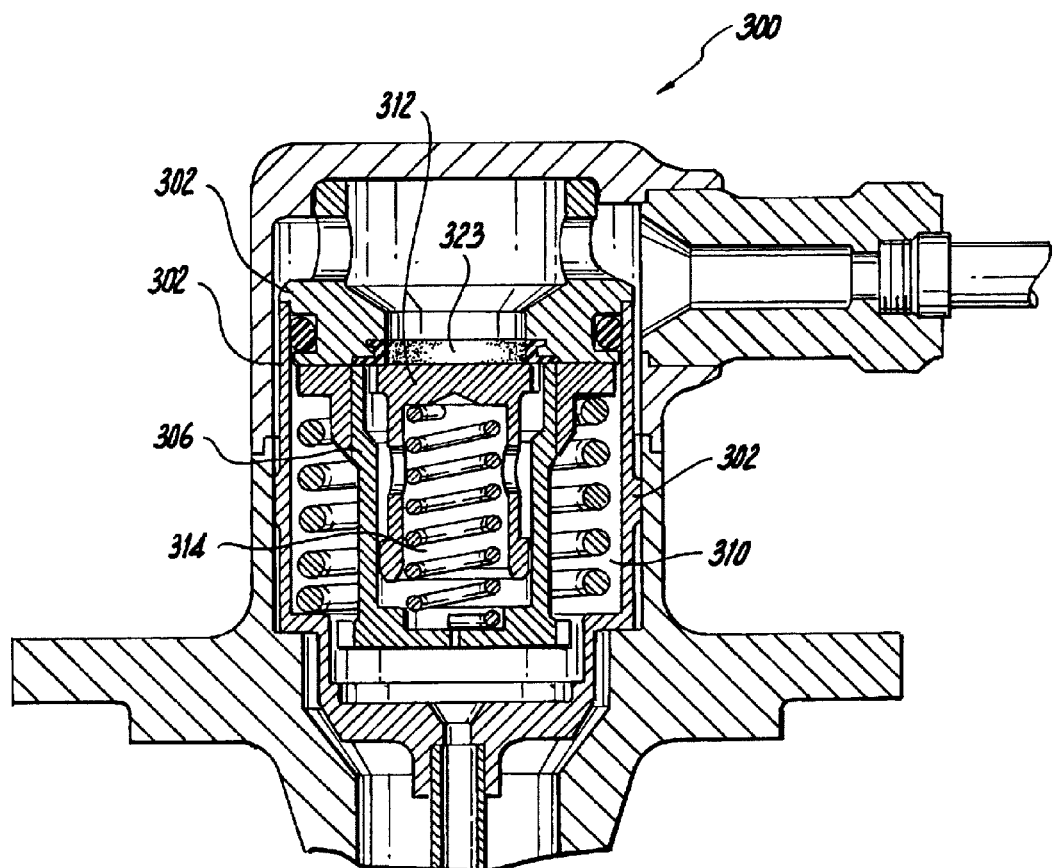
FIG. 23 is a cross-sectional side elevation view of another embodiment of a multi-stage check valve constructed in accordance with the present invention, showing the valve members blocking the pilot and main flow paths wherein the pilot valve member and the main valve member are seated against a common seal component of the valve housing.
Figure 24:
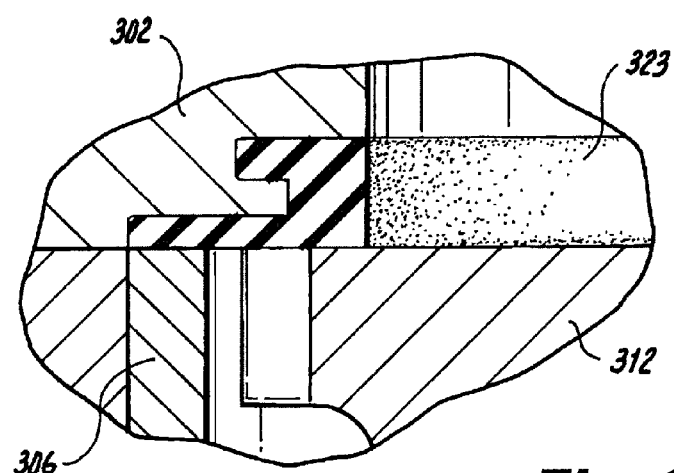
FIG. 24 is an expanded cross-sectional side elevation view of a portion of the multi-stage check valve of FIG. 23, showing the seal component of the valve housing.
Figure 25:
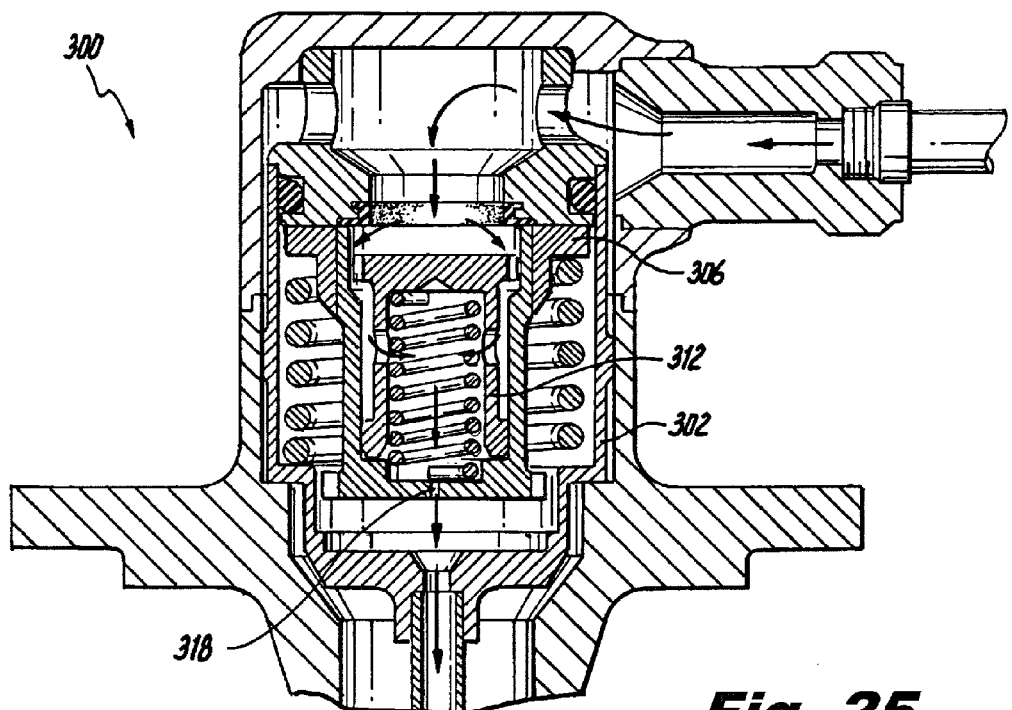
FIG. 25 is a cross-sectional side elevation view of the multi-stage check valve of FIG. 23, showing the pilot valve member displaced to allow fuel to flow through the pilot flow path.
Figure 26:
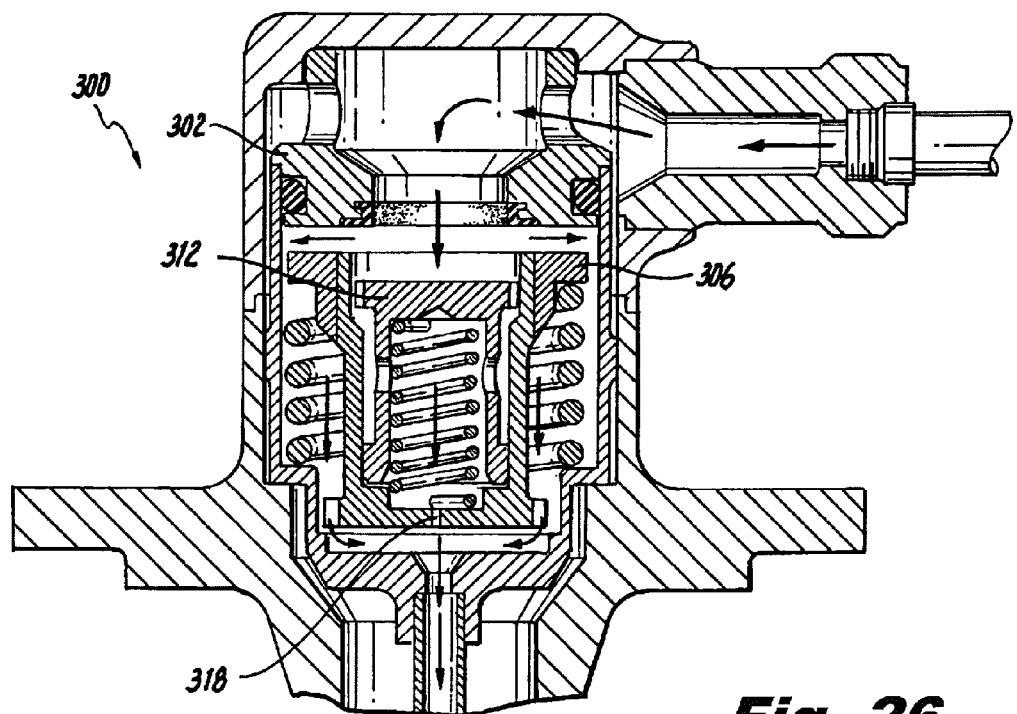
FIG. 26 is a cross-sectional side elevation view of the multi-stage check valve of FIG. 23, showing the pilot and main valve members displaced to allow fuel to flow through the main and pilot flow paths.

As shown in FIG. 23, a multi-stage check valve 300 is contemplated having a valve housing 302 that includes a single seal component 323 configured and adapted to form a seal with both main valve member 306 and pilot valve member 312 to block main fuel path 310 and pilot fuel path 314 with main valve member 306 and pilot valve member 312 each their respective first position. FIG. 24 shows a detail of main and pilot valve members 306/312 seated against seal component 323 of valve housing 302, which is the zero flow state of multi-stage check valve 300. The operation of pilot and main valve members 306/312 is otherwise similar to multi-stage check valve 100 described above. FIG. 25 shows multi-stage check valve 300 with pilot valve member 312 displaced to allow fuel to flow through the pilot fuel path including metering orifice 318 of main valve member 306, as indicated by arrows. FIG. 26 shows multi-stage check valve 300 with main and pilot valve members 306/312 displaced to allow fuel to flow through both fuel paths into conduit 328, as indicated by arrows.

Figure 27:
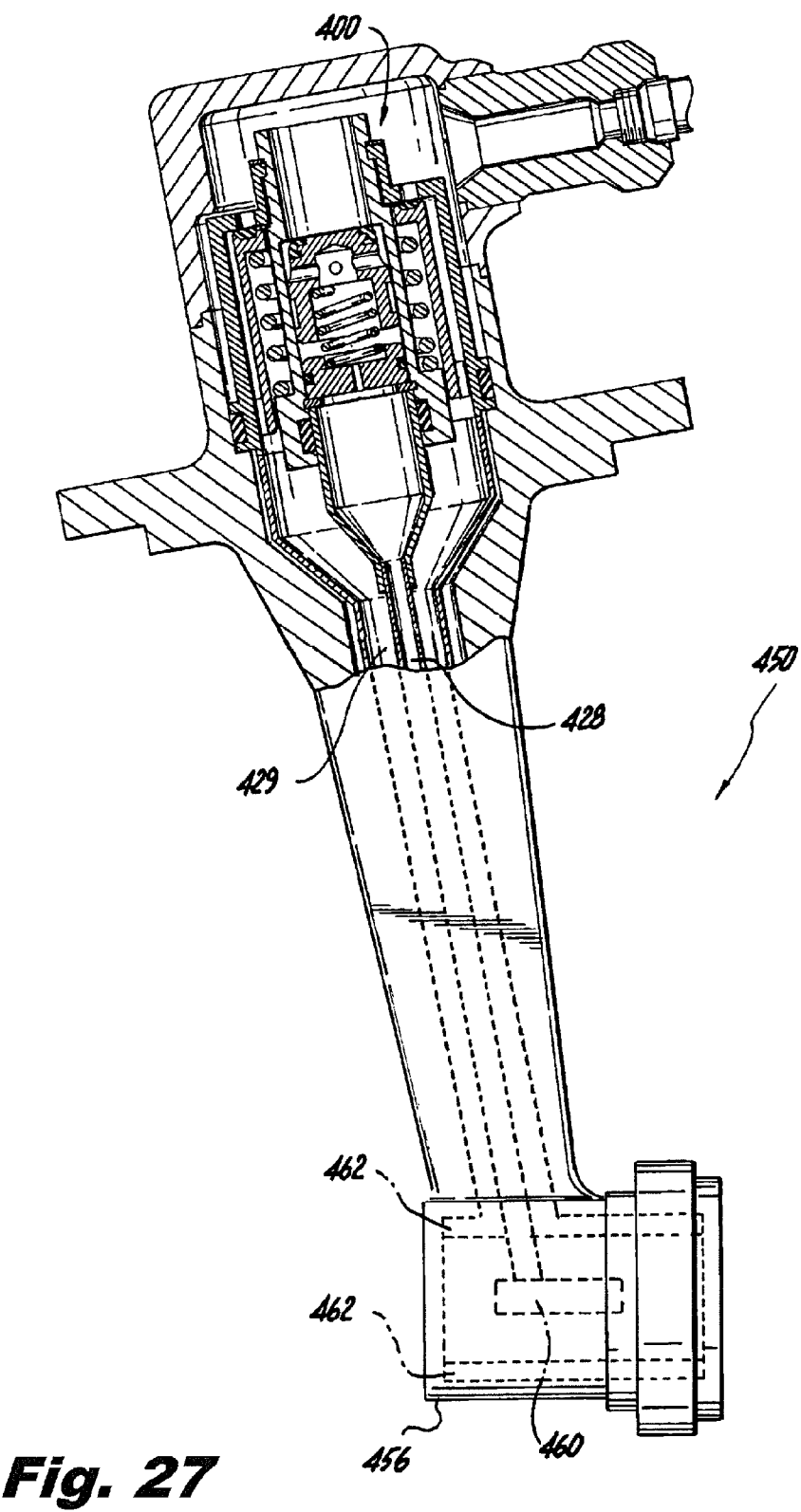
FIG. 27 is a partial cross-sectional side elevation view of a fuel injector constructed in accordance with the present invention including a multi-stage check valve, showing the first and second fuel conduits fluidly connecting first and second fuel paths of the multi-stage check valve to first and second fuel circuits of the nozzle body.
Figure 28:
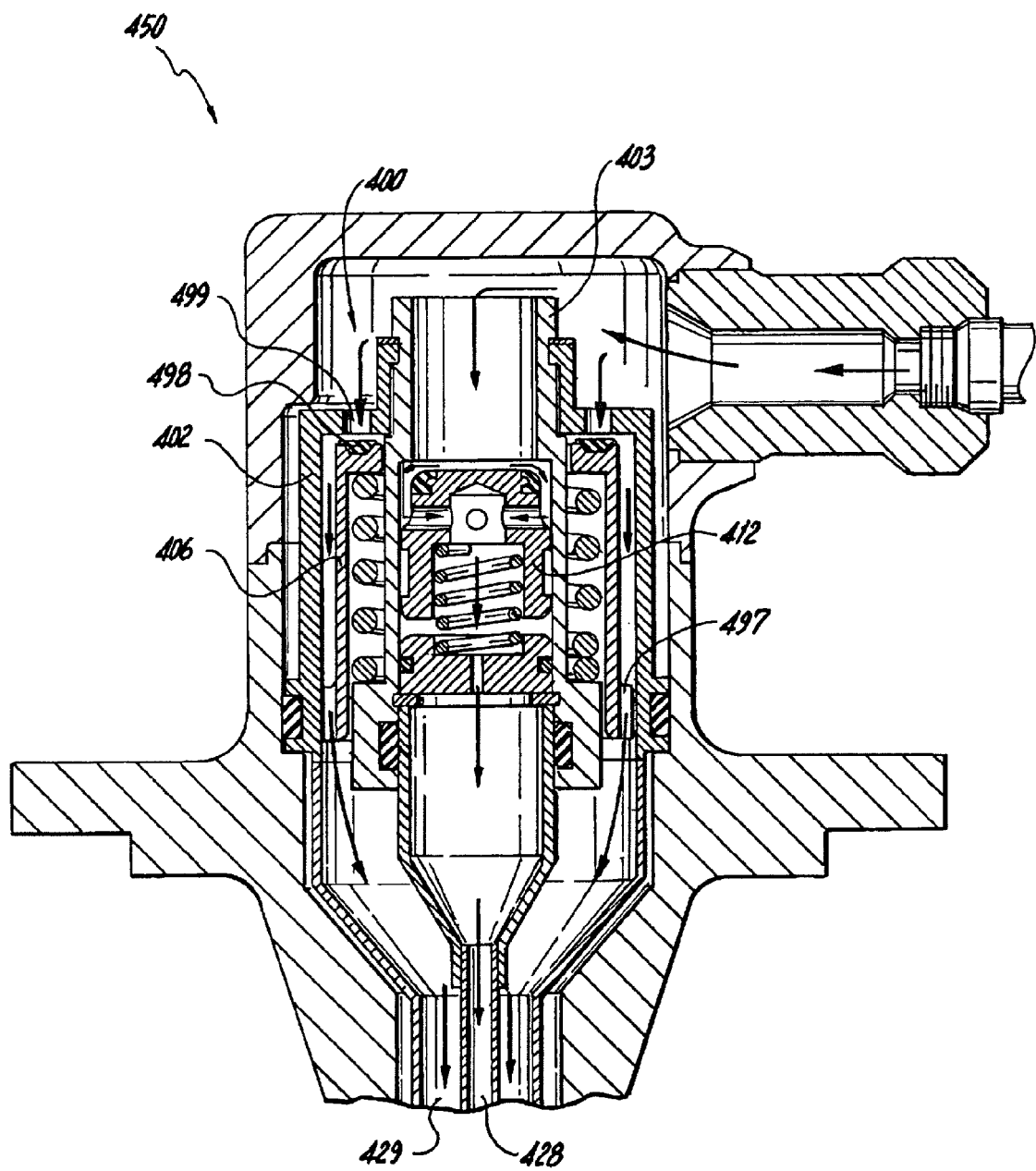
FIG. 28 is a cross-sectional side elevation view of a portion of the fuel injector of FIG. 27, showing first and second fuel paths of the multi-stage check valve in fluid communication with first and second conduits of the injector, respectively.

Fuel injector 450, shown in FIGS. 27 and 28, includes two fuel conduits. First fuel conduit 428 fluidly connects the first fuel path of multi-stage check valve 400 with a first fuel circuit 460 of nozzle body 456. A second fuel conduit 429 fluidly connects the second fuel path of the multi-stage check valve 400 with a second fuel circuit 462 of nozzle body 456. FIG. 27 shows main valve member 406 and pilot valve member 412 of multi-stage check valve 400 each in a first position, blocking the respective main and pilot fuel paths (some reference characters are not shown in FIG. 27 for sake of clarity, but see FIG. 28).

When a pilot threshold pressure is reached, pilot valve member 412 is displaced within fixed member 403 to open the pilot fuel path into conduit 428, much as described above with respect to pilot valve member 112. However, seal 498 of main valve member 406 is seated against openings 499 of fixed housing 402 to prevent fuel passing through main conduit 429 into second fuel circuit 462. When a main pressure threshold is reached, main valve member 406 is also displaced to open the main fuel path into main conduit 429 through openings 499 and slots 497, as shown in FIG. 28. In this manner, separate main and pilot flows are maintained, as indicated by arrows in FIG. 28. Separation of main and pilot flows in this manner is exemplary, as any other suitable means can be used to separate main and pilot flows.

Multi-stage check valve 100 (FIG. 10) provides fuel from both main and pilot fuel paths 110/114 to a single fuel conduit 128 to provide for ignition sequencing without non-atomized fuel leaking from the nozzle outlet, as described above. However, since multi-stage check valve 400 (FIG. 28) separates fuel into pilot and main conduits 428/429, it can be used to stage fuel flow for high and low power operation. It is also contemplated that additional valve members can be included for ignition sequencing and regulating flow between high and low power operation.

Figure 29:
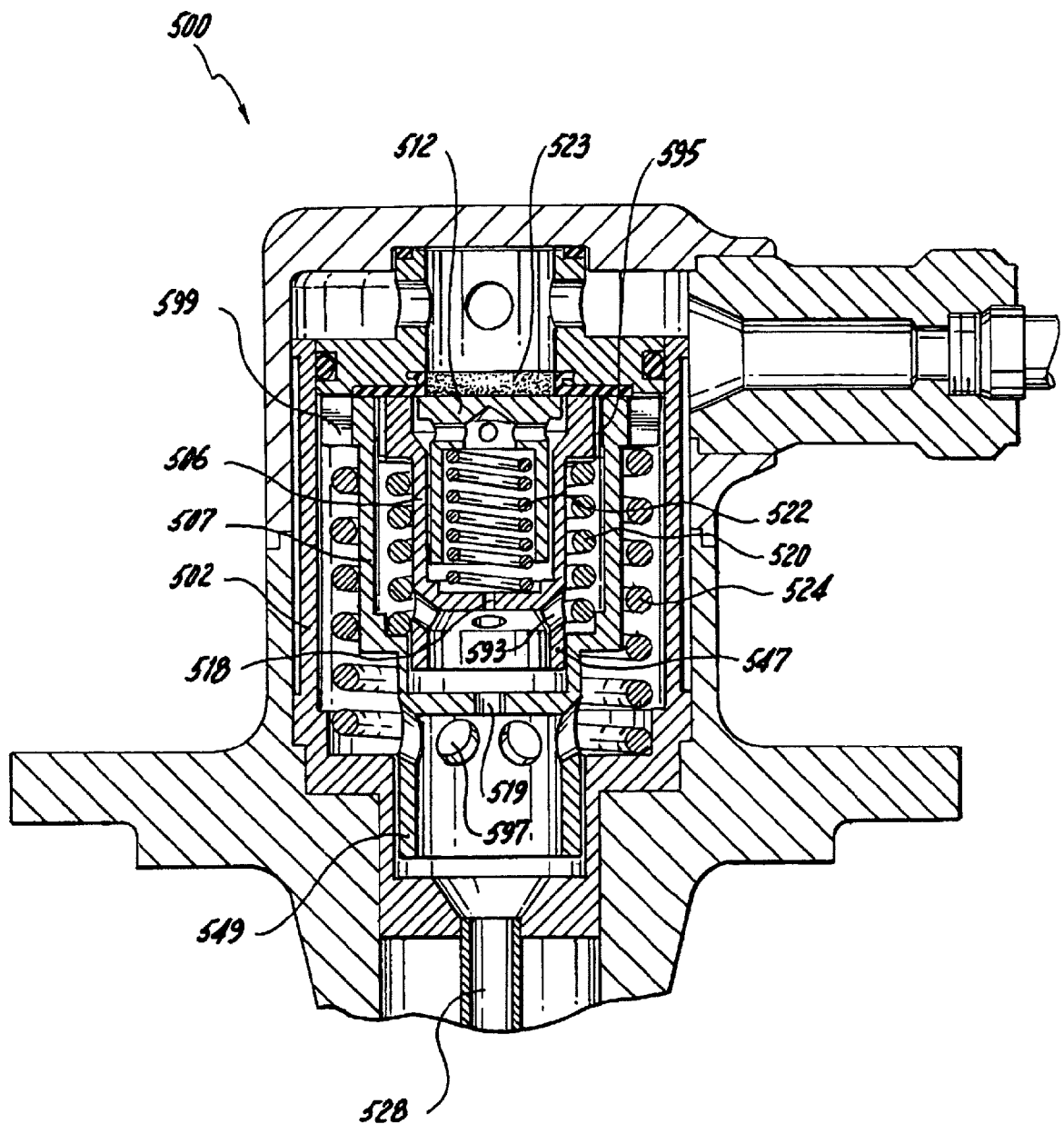
FIG. 29 is a cross-sectional side elevation view of another embodiment of a multi-stage check valve constructed in accordance with the present invention, showing a third valve member for providing a mid-power condition flow distribution.

As shown in FIG. 29, multi-stage check valve 500 includes a pilot valve member 512 similar to pilot valve member 312 shown in FIG. 23. Pilot valve member 512 is connected to main valve member 506 through a spring member 522. Main valve member 506 includes a metering orifice 518, which operates much the same as metering orifice 118 described above. Main valve member 506 is connected to a third valve member 507 by means of spring member 520. Third valve member 507 includes an intermediate metering orifice 519 which has a size between the size of metering orifice 518 and the opening into conduit 528. Third valve member 507 is in turn connected to valve housing 502 by means of a third spring member 524.

With continued reference to FIG. 29, pilot valve member 512 operates in much the same way as pilot valve member 312 in FIG. 23, as described above. When pressure builds due to metering orifice 518, valve member 506 unseats from seal member 523 and fuel can flow past valve member 506 through slots 595 and 593, through metering orifice 519, and into conduit 528. Standoff 547 ensures that the bottom of valve member 506 will not block metering orifice 519 and provides a guide for movement of valve member 506 within valve member 507.

Intermediate metering orifice 519 of third valve member 507 allows metering of fuel between the predetermined crack pressure of main valve member 506 and a third predetermined pressure at which third valve member 507 will crack. When valve member 507 unseats from seal member 523, it opens a third fuel path past third valve member 507 through slots 599 and openings 597 into conduit 528. Standoff 549 serves to prevent the bottom of valve member 507 from blocking conduit 528 and provides a guide for movement of valve member 507 within housing 502.

The piston areas of valve members 506/507/512, the spring constants of spring members 520/522/524, and the sizes of metering orifices 518/519 can all be configured to provide the desired predetermined crack pressures for the respective valve members. Multi-stage check valve 500 can be used, for instance, if there is a mid-power condition that is important for flow distribution in addition to the main and pilot flow conditions described above.

As shown in the example of FIG. 29, all three valve members 506/507/512 seat against a common seal component 523 in the zero flow condition. Those skilled in the art will readily appreciate that in this same manner, any number of additional stages could be added to a multi-stage check valve in accordance with the present invention. Moreover, those skilled in the art will readily appreciate that multi-stage check valves having more than two stages can be used in injectors having multiple conduits and fuel circuits, as described above with reference to FIGS. 27 and 28.

The valve members and housings described herein can be made of typical injector materials including stainless steel 300 or 400 series, or any other suitable material. Other exemplary materials include super nickel alloys such as AMS 5666, AMS 5754, AMS 5656, AMS 5643, AMS 5622, AMS 5732, AMS 5737, AMS 5895, and AMS 5616. The springs can be of similar materials and can also include, e.g. AMS 5708, AMS 5709, AMS 5706, AMS 5707, AMS 5678, AMS 5659, AMS 5698, or AMS 5699. The seal components described herein can include 75 durometer low temperature Viton® rubber, available from DuPont of Wilmington, Del., which can be characterized as ASTM D1418 and ISO 1629. Elastomeric materials for seal components should be chosen for suitability for the fuel injector environment. It is also possible to make a multi-stage check valve without elastomeric seals (i.e. metal to metal seals and the like), which could have the result of a predetermined leakage rate. It is also contemplated that a single multi-stage check valve can have one or more stages with hard seals and one or more stages with elastomeric seals. Those skilled in the art will readily appreciate that any other suitable materials can be used in the components of multi-stage check valves without departing from the spirit and scope of the invention.

The multi-stage check valves described above take the benefits of the scheduling valve at the lower pressure conditions of distributing flow evenly about the manifold. They also remove the hysteresis concerns present in scheduling valves, since there is no dependency upon spring compression and metering for a set pressure. The multi-stage check valves disclosed herein also reduce the amount of precision porting required and there is no match grind required. They further provide a fuel distribution that is better than known simple check valves at lower power conditions, and the variance at high power conditions is also better than known simple check valves.

The methods and systems of the present invention, as described above and shown in the drawings, provide for a multi-stage check valve with superior properties including improved regulation of fuel flow at low flow conditions while having low tolerance requirements, little or now hysteresis, and accommodation for fuel contaminants and particles. While the apparatuses and methods of subject invention have been shown and described with reference to preferred embodiments, those skilled in the art will readily appreciate that changes and/or modifications may be made thereto without departing from the spirit and scope of the subject invention.

What is claimed is:

1. A multi-stage check valve for regulating fuel flow in a fuel injector of a gas turbine engine comprising:
   a) a valve housing defining an internal valve chamber;
   b) a main valve member within the valve chamber of the valve housing, the main valve member having an internal valve chamber and being configured for movement between a first position and a second position, wherein in the first position thereof, the main valve member blocks fuel below a predetermined main pressure from flowing through a main fuel path, and in the second position thereof, the main valve member is displaced to allow fuel above the predetermined main pressure to flow through the main fuel path; and
   c) a pilot valve member within the valve chamber of the main valve member, the pilot valve member having a piston portion with an internal pilot flow cavity and being configured for movement relative to the main valve member between a first position and a second position, wherein in the first position thereof, the pilot valve member engages a pilot valve seat to block fuel below a predetermined pilot pressure from flowing through a pilot fuel path, and in the second position thereof, the pilot valve member is displaced to allow fuel above the predetermined pilot pressure to flow through the pilot fuel path, wherein the pilot fuel path includes a metering orifice configured for movement within the internal valve chamber and spaced axially downstream of the pilot valve seat, and wherein in the first position of the pilot valve member, the pilot valve member blocks the pilot fuel path at a position spaced apart from the metering orifice.

2. A multi-stage check valve as recited in claim 1, wherein the predetermined pilot pressure is lower than the predetermined main pressure.

3. A multi-stage check valve as recited in claim 2, further comprising an orifice member defining the metering orifice therethrough operatively associated with the main valve member to meter fuel flow through the pilot fuel path for fuel between the predetermined pilot and main pressures.

4. A multi-stage check valve as recited in claim 1, wherein the main valve member is operatively connected to the valve housing through a first spring member configured and adapted to bias the main valve member to block the main fuel path in the first position of the main valve member.

5. A multi-stage check valve as recited in claim 4, wherein the pilot valve member is operatively connected to a second spring member configured and adapted to bias the pilot valve member to block the pilot fuel path in the first position of the pilot valve member.

6. A multi-stage check valve as recited in claim 1, wherein the main valve member includes a seal component configured and adapted to form a seal with the valve housing to block the main fuel path in the first position of the main valve member.

7. A multi-stage check valve as recited in claim 1, wherein the pilot valve member includes a seal component configured and adapted to form a seal with the main valve member to block the pilot fuel path in the first position of the pilot valve member.

8. A multi-stage check valve as recited in claim 1, wherein the valve housing includes a seal component configured and adapted to form a seal with both of the main and pilot valve members to block the main and pilot fuel paths with the main and pilot valve members in the respective first positions.

9. A multi-stage check valve as recited in claim 8, wherein the seal component includes an elastomeric material.

10. A multi-stage check valve as recited in claim 1, further comprising a third valve member between the valve housing and the main valve member, wherein the third valve member is configured for movement between a first position and a second position, wherein in the first position thereof, the third valve member blocks fuel below a third predetermined pressure from flowing through a third fuel path, and in the second position thereof, the third valve member is displaced to allow fuel above the third predetermined pressure to flow through the third fuel path.

11. A fuel injector for a gas turbine engine comprising:
   a) a fuel feed arm having a fuel inlet fitting in fluid communication with at least one fuel conduit within the fuel feed arm;
   b) a nozzle body depending from the fuel arm and including a fuel outlet in fluid communication with the at least one fuel conduit of the fuel feed arm; and
   c) a multi-stage check valve within the fuel feed arm operatively connected to the at least one fuel conduit, wherein the multi-stage check valve includes:
      i) a valve housing defining an internal valve chamber;
      ii) a main valve member within the valve chamber of the valve housing, the main valve member having an internal valve chamber and being configured for movement between a first position and a second position, wherein in the first position thereof, the main valve member blocks fuel below a predetermined main pressure from flowing through a main fuel path, and in the second position thereof, the main valve member is displaced to allow fuel above the predetermined main pressure to flow through the main fuel path; and
      iii) a pilot valve member within the valve chamber of the main valve member, the pilot valve member having a piston portion with an internal pilot flow cavity and being configured for movement relative to the main valve member between a first position and a second position, wherein in the first position thereof, the pilot valve member engages a pilot valve seat to block fuel below a predetermined pilot pressure from flowing through a pilot fuel path, and in the second position thereof, the pilot valve member is displaced to allow fuel above the predetermined pilot pressure to flow through the pilot fuel path, wherein the pilot fuel path includes a metering orifice configured for movement within the internal valve chamber and spaced axially downstream of the pilot valve seat, and wherein in the first position of the pilot valve member, the pilot valve member blocks the pilot fuel path at a position spaced apart from the metering orifice.

12. A fuel injector as recited in claim 11, wherein the predetermined pilot pressure is lower than the predetermined main pressure.

13. A fuel injector as recited in claim 12, further comprising an orifice member defining the metering orifice therethrough operatively associated with the main valve member to meter fuel flow through the pilot fuel path for fuel between the predetermined pilot and main pressures.

14. A fuel injector as recited in claim 11, wherein the main valve member is operatively connected to the valve housing through a first spring member configured and adapted to bias the main valve member to block the main fuel path in the first position of the main valve member.

15. A fuel injector as recited in claim 14, wherein the pilot valve member is operatively connected to a second spring member configured and adapted to bias the pilot valve member to block the pilot fuel path in the first position of the pilot valve member.

16. A fuel injector as recited in claim 11, wherein the main valve member includes a seal component configured and adapted to form a seal with the valve housing to block the main fuel path in the first position of the main valve member.

17. A fuel injector as recited in claim 11, wherein the pilot valve member includes a seal component configured and adapted to form a seal with the main valve member to block the pilot fuel path in the first position of the pilot valve member.

18. A fuel injector as recited in claim 11, wherein the valve housing includes a seal component configured and adapted to form a seal with both of the main and pilot valve members to block the pilot and main fuel paths with the main and pilot valve members in the respective first positions.

19. A fuel injector as recited in claim 11, wherein the fuel feed arm includes a first fuel conduit fluidly connecting the first fuel path of the multi-stage check valve with a first fuel circuit of the nozzle body, and a second fuel conduit fluidly connecting the second fuel path of the multi-stage check valve with a second fuel circuit of the nozzle body.

20. A multi-stage check valve for regulating flow of fuel to a fuel injector in a gas turbine engine comprising:
   a) a valve housing that defines an internal valve chamber, the valve housing including an inlet for receiving fuel at an inlet fuel pressure;
   b) a main valve member within the valve chamber of the valve housing, the main valve member having an internal valve chamber and being operatively connected to the valve housing through a first spring member configured and adapted to bias the main valve member to block a main fuel path in a first position of the main valve member with inlet fuel pressure below a predetermined main pressure and to allow the main valve member to be displaced to allow fuel to flow through the main fuel path in a second position of the main valve member with inlet fuel pressure above the predetermined main pressure;
   c) an orifice member defining a metering orifice therethrough operatively associated with the main valve member to meter fuel flow through a pilot fuel path with inlet fuel pressure between the predetermined main pressure and a predetermined pilot pressure; and
   d) a pilot valve member within the valve chamber of the main valve member, the pilot valve member having a piston portion with an internal pilot flow cavity and being operatively connected to a second spring member configured and adapted to bias the pilot valve member to engage a pilot valve seat to block the pilot fuel path in a first position of the pilot valve member with the inlet fuel pressure below the predetermined pilot pressure and to allow the pilot valve member to be displaced relative to the main valve member to allow fuel to flow through the pilot fuel path in a second position of the pilot valve member with the inlet fuel pressure above the predetermined pilot pressure, wherein the pilot fuel path includes the metering orifice configured for movement within the internal valve chamber and spaced axially downstream of the pilot valve seat, and wherein in the first position of the pilot valve member, the pilot valve member blocks the pilot fuel path at a position spaced apart from the metering orifice.

* * * * *